(12) United States Patent
Liang et al.

(10) Patent No.: US 12,451,036 B2
(45) Date of Patent: Oct. 21, 2025

(54) LASER PROJECTION APPARATUS, PROJECTION DISPLAY SYSTEM, AND PROJECTION DISPLAY METHOD

(71) Applicant: HISENSE LASER DISPLAY CO., LTD, Shandong (CN)

(72) Inventors: Qian Liang, Shandong (CN); Dabo Guo, Shandong (CN); Jichen Xiao, Shandong (CN); Lingyue Cui, Shandong (CN); Chao Wu, Shandong (CN); Kai Wu, Shandong (CN)

(73) Assignee: HISENSE LASER DISPLAY CO., LTD, Qingdao (CN)

( * ) Notice: Subject to any disclaimer, the term of this patent is extended or adjusted under 35 U.S.C. 154(b) by 0 days.

(21) Appl. No.: 18/618,438

(22) Filed: Mar. 27, 2024

(65) Prior Publication Data
US 2024/0312377 A1    Sep. 19, 2024

Related U.S. Application Data

(63) Continuation of application No. PCT/CN2022/102066, filed on Jun. 28, 2022.

(30) Foreign Application Priority Data

Sep. 30, 2021    (CN) .......................... 202111159111.3
Sep. 30, 2021    (CN) .......................... 202111161811.6
(Continued)

(51) Int. Cl.
*G09G 3/00*    (2006.01)
*G03B 21/00*    (2006.01)
(Continued)

(52) U.S. Cl.
CPC ........... *G09G 3/001* (2013.01); *G03B 21/008* (2013.01); *G03B 21/204* (2013.01);
(Continued)

(58) Field of Classification Search
CPC .... G09G 3/001; G03B 21/008; G03B 21/204; H04N 9/3135; H04N 9/3161; H04N 9/3179; H04N 9/31; H04N 9/3188; H04N 21/41
See application file for complete search history.

(56) References Cited

U.S. PATENT DOCUMENTS

2006/0029252 A1* 2/2006 So ..................... H04N 21/23892
                                                               380/201
2008/0284763 A1* 11/2008 Someya ................. G09G 3/001
                                                               345/204
(Continued)

FOREIGN PATENT DOCUMENTS

CN        106507075 A        3/2017
CN        107315309 A       11/2017
(Continued)

OTHER PUBLICATIONS

International Search Report and Written Opinion dated Sep. 22, 2022 in corresponding International Application No. PCT/CN2022/102066, translated, 22 pages.
(Continued)

*Primary Examiner* — Md Saiful A Siddiqui
(74) *Attorney, Agent, or Firm* — MH2 TECHNOLOGY LAW GROUP LLP

(57) ABSTRACT

A laser projection apparatus is provided and includes an optical modulating assembly, a vibrating device, a projection lens, and a circuit architecture. The circuit architecture includes an image processing sub-circuit and a display driving sub-circuit. The image processing sub-circuit is configured to perform frame division on image data of an image to be displayed to obtain image signals of a plurality of frames of sub-images to generate a frame division control signal. The display driving sub-circuit is configured to output the image signals of the plurality of frames of
(Continued)

sub-images to the optical modulating assembly and output a vibration instruction to the vibrating device based on the output timing of the image signals of the plurality of frames of sub-images, so as to control the vibrating device to perform vibrations, so that the projection beams are output through the vibrating device.

20 Claims, 10 Drawing Sheets

(30) Foreign Application Priority Data

Nov. 9, 2021 (CN) ............................ 202111320711.3
Nov. 9, 2021 (CN) ............................ 202122734014.4

(51) Int. Cl.
  *G03B 21/20* (2006.01)
  *H04N 9/31* (2006.01)

(52) U.S. Cl.
  CPC ......... *H04N 9/3135* (2013.01); *H04N 9/3161* (2013.01); *H04N 9/3179* (2013.01)

(56) References Cited

U.S. PATENT DOCUMENTS

| | | | | |
|---|---|---|---|---|
| 2012/0133902 | A1* | 5/2012 | Nishioka | H04N 9/3155 353/31 |
| 2014/0036239 | A1* | 2/2014 | Mashitani | H04N 9/312 353/101 |
| 2014/0340492 | A1* | 11/2014 | Abe | H04N 13/341 348/51 |
| 2017/0099484 | A1* | 4/2017 | Mashitani | H04N 13/363 |
| 2017/0111621 | A1* | 4/2017 | Tian | H04N 9/3155 |
| 2017/0187998 | A1 | 6/2017 | Xiao et al. | |
| 2017/0272717 | A1 | 9/2017 | Nishizawa et al. | |
| 2018/0149958 | A1* | 5/2018 | Kong | G02B 9/62 |
| 2020/0092469 | A1* | 3/2020 | Lin | H04N 9/3126 |

FOREIGN PATENT DOCUMENTS

| | | |
|---|---|---|
| CN | 110602470 A | 12/2019 |
| CN | 111698487 A | 9/2020 |
| CN | 112114478 A | 12/2020 |
| CN | 113824940 A | 12/2021 |
| CN | 113824941 A | 12/2021 |
| CN | 113923426 A | 1/2022 |
| CN | 216122706 U | 3/2022 |

OTHER PUBLICATIONS

Chinese First Office Action dated Nov. 12, 2024 in corresponding Chinese Application No. 202111320711.3, translated, 16 pages.
Chinese Third Office Action dated Jun. 21, 2025 in corresponding Chinese Application No. 202111320711.3, 16 pages.

* cited by examiner

--------→ Green fluorescent beam
— — →   Red fluorescent beam
————→   Blue fluorescent beam

LASER PROJECTION APPARATUS, PROJECTION DISPLAY SYSTEM, AND PROJECTION DISPLAY METHOD

CROSS-REFERENCE TO RELATED APPLICATIONS

This application is a continuation application of International Application No. PCT/CN2022/102066, filed on Jun. 28, 2022, which claims priority to Chinese Patent Application No. 202111159111.3, filed on Sep. 30, 2021, Chinese Patent Application No. 202111161811.6, filed on Sep. 30, 2021, Chinese Patent Application No. 202111320711.3, filed on Nov. 9, 2021, and Chinese Patent Application No. 202122734014.4, filed on Nov. 9, 2021, which are incorporated herein by reference in their entireties.

TECHNICAL FIELD

The present disclosure relates to the field of projection display and, in particular, to a laser projection apparatus, a projection display system, and a projection display method.

BACKGROUND

At present, a laser projection apparatus may include an optical modulating assembly, a laser source, and a projection lens. The laser source provides illumination beams containing three primary colors for the laser projection apparatus. The optical modulating assembly usually uses a digital micromirror device (DMD) composed of numerous digital micromirrors to modulate an image signal of the illumination beams and reflect it to form a projection beam. The projection beam formed by the modulation of the optical modulating assembly enters the projection lens and is ultimately projected onto a projection screen, so as to implement functions such as video playback.

SUMMARY

In an aspect, some embodiments of the present disclosure provide a laser projection apparatus, including a laser source, an optical modulating assembly, a vibrating device, a projection lens, and a circuit architecture. The laser source is configured to provide illumination beams. The optical modulating assembly includes a digital micromirror device. The optical modulating assembly is configured to modulate the illumination beams provided by the laser source based on image signals to obtain projection beams. The vibrating device is configured to receive and output the projection beams. The projection lens is configured to receive the projection beams and project the projection beams into an image. The circuit architecture is configured to drive at least the laser source and the optical modulating assembly to operate. The circuit architecture includes a display driving circuit. The display driving circuit includes an image processing sub-circuit and a display driving sub-circuit. The image processing sub-circuit is configured to perform frame division on image data of an image to be displayed according to a preset frame division method to obtain image signals of a plurality of frames of sub-images, generate a frame division control signal based on the image signals of the plurality of frames of sub-images, and send the frame division control signal to the display driving sub-circuit. The display driving sub-circuit is coupled to the image processing sub-circuit, the digital micromirror device, and the vibrating device. The display driving sub-circuit is configured to receive the frame division control signal of the plurality of frames of sub-images, output the image signals of the plurality of frames of sub-images to the digital micromirror device according to an output timing of the image signals of the plurality of frames of sub-images based on the frame division control signal, and output a vibration instruction to the vibrating device based on the output timing of the image signals of the plurality of frames of sub-images, so as to control the vibrating device to perform vibrations in multiple directions, so that projection beams corresponding to different image signals of the sub-images are output through vibrations of the vibrating device in sequence.

In another aspect, some embodiments of the present disclosure provide a projection display system. The projection display system includes a projection screen and the laser projection apparatus according to any one of the above embodiments.

In yet another aspect, some embodiments of the present disclosure provide a projection display method of a laser projection apparatus. The laser projection apparatus includes an optical modulating assembly, a vibrating device, and a laser source. The optical modulating assembly includes a digital micromirror device. The method includes: performing frame division on image data of an image to be displayed according to a preset frame division method to obtain image signals of a plurality of frames of sub-images; generating a frame division control signal based on an image signal of each frame of sub-image; and outputting the image signal of each frame of sub-image to the optical modulating assembly based on the frame division control signal. The step of outputting the image signal of each frame of sub-image to the optical modulating assembly includes: outputting the image signals of the plurality of frames of sub-images to the digital micromirror device according to an output timing of the image signals of the plurality of frames of sub-images based on the frame division control signal, and outputting a vibration instruction to the vibrating device based on the output timing of the image signals of the plurality of frames of sub-images, so as to control the vibrating device to perform vibrations in multiple directions, so that projection beams corresponding to different image signals of the sub-images are output through vibrations of the vibrating device in sequence.

In yet another aspect, some embodiments of the present disclosure provide a non-transitory computer-readable storage medium storing computer program instructions that, when executed by a computer, cause the computer to perform one or more steps in the projection display method according to any one of the above embodiments.

In yet another aspect, some embodiments of the present disclosure provide a computer program product comprising computer program instructions stored on a computer-readable storage medium. The computer program instructions, when executed by a computer, cause the computer to perform one or more steps in the projection display method according to any one of the above embodiments.

DETAILED DESCRIPTION

Figure 1:
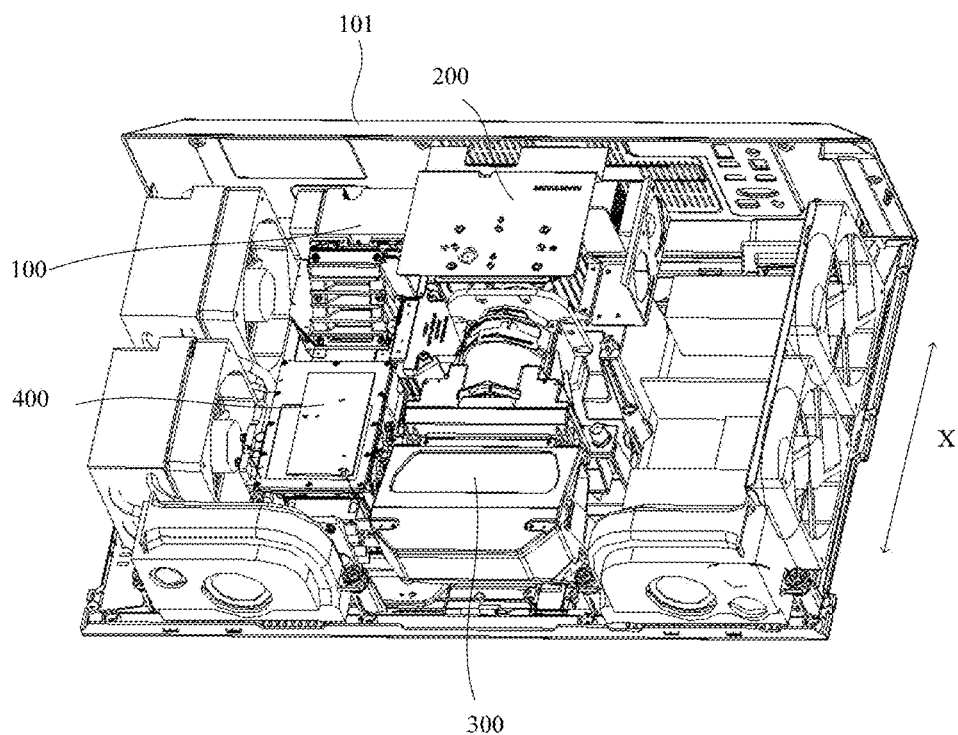
FIG. 1 is a structural diagram of a laser projection apparatus, in accordance with some embodiments of the present disclosure.

The technical solutions in some embodiments of the present disclosure will be described clearly and completely with reference to the accompanying drawings; however, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the specification and claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first" and "second" are used for descriptive purposes only and are not to be construed as indicating or implying the relative importance or implicitly indicating the number of indicated technical features. Thus, features defined as "first" and "second" may explicitly or implicitly include one or more of the features. In the description of the embodiments of the present disclosure, the term "a plurality of" or "the plurality of" means two or more unless otherwise specified.

In the description of some embodiments, the term "coupled" and "connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. The term "coupled" or "communicatively coupled," however, may also mean that two or more components are not in direct contact with each other, but still cooperate or interact with each other. The embodiments disclosed herein are not necessarily limited to the content herein.

The phrase "applicable to" or "configured to" used herein has an open and inclusive meaning, which does not exclude devices that are applicable to or configured to perform additional tasks or steps.

In addition, the phrase "based on" used herein has an open and inclusive meaning, since a process, step, calculation, or other action that is "based on" one or more of the stated conditions or values may, in practice, be based on additional conditions or values exceeding those stated.

Due to low resolution of a digital micromirror device, the digital micromirror device is unable to directly display high-resolution images (such as 4K images). Therefore, a vibrating lens is usually disposed in the laser projection apparatus in cooperation with the output of the digital micromirror device, and display of the high-resolution images is achieved through vibration of the vibrating lens. However, with the continuous improvement of image quality requirements, the resolution of images is getting higher and higher. Conventional digital micro mirror devices and vibrating lenses are no longer able to achieve output and display of the high-resolution images (such as 8K or even higher). The hardware limitation on software output has affected the viewing experience.

In addition, the digital micromirror device and the vibrating lens further need to be configured with a matching display panel and driver. The display panel receives and processes the image to be displayed, so as to obtain an image signal. The driver controls the digital micromirror device and the vibrating lens to output the image signal. In general, the display panel and the driver are a matching assembly or an integrated assembly. However, a processing power of the display panel is limited. If upgrading the display panel, the driver in the matching assembly needs to be replaced because the high-frequency updates and the high-resolution images are difficult to be adapted. Even if the cost is invested to replace the display panel and the driver, it may still be unable to output the high-resolution images due to the above-mentioned defects of the digital micromirror device.

In view of this, as shown in FIG. 1, in some embodiments of the present disclosure, a laser projection apparatus 10 is provided. The laser projection apparatus 10 includes an apparatus housing 101 (only part of the apparatus housing 101 being shown in FIG. 1), and a laser source 100, an optical modulating assembly 200, a projection lens 300, and a circuit architecture 400 that are assembled in the apparatus housing 101. The laser source 100 is configured to provide illumination beams (laser beams). The optical modulating assembly 200 is configured to modulate the illumination beams provided by the laser source 100 with image signals to obtain projection beams. The projection lens 300 is configured to project the projection beams on a screen or a wall for imaging. The circuit architecture 400 is configured to drive at least the laser source 100 and the optical modulating assembly 200 to operate. The laser source 100, the optical modulating assembly 200, and the projection lens 300 are sequentially connected in a propagation direction of beams and are wrapped by corresponding housings. Housings of the laser source 100, the optical modulating assembly 200, and the projection lens 300 support their optical components respectively and make the optical components meet certain sealing or airtight requirements. For example, the laser source 100 is hermetically sealed through its shell, which may well solve a light attenuation problem of the laser source 100.

An end of the optical modulating assembly 200 is connected to the projection lens 300, and the optical modulating assembly 200 and the projection lens 300 are arranged in a first direction X of the entire apparatus. For example, the first direction X may be a width direction of the entire apparatus. Another end of the optical modulating assembly 200 is connected to the laser source 100. In this example, a direction in which the laser source 100 is connected to the optical modulating assembly 200 is perpendicular to a direction in which the optical modulating assembly 200 is connected to the projection lens 300. Such a connection structure may not only adapt to characteristics of a beam path of a reflective light valve in the optical modulating assembly 200 but may also reduce a length of a beam path in a single dimension and thus facilitate structural arrangement of the entire apparatus. For example, in a case where the laser source 100, the optical modulating assembly 200, and the projection lens 300 are disposed in a one-dimensional direction (e.g., a direction Y being perpendicular to the first direction X), the length of the beam path in this direction is long, which is not conducive to the structural arrangement of the entire apparatus.

Figure 2:
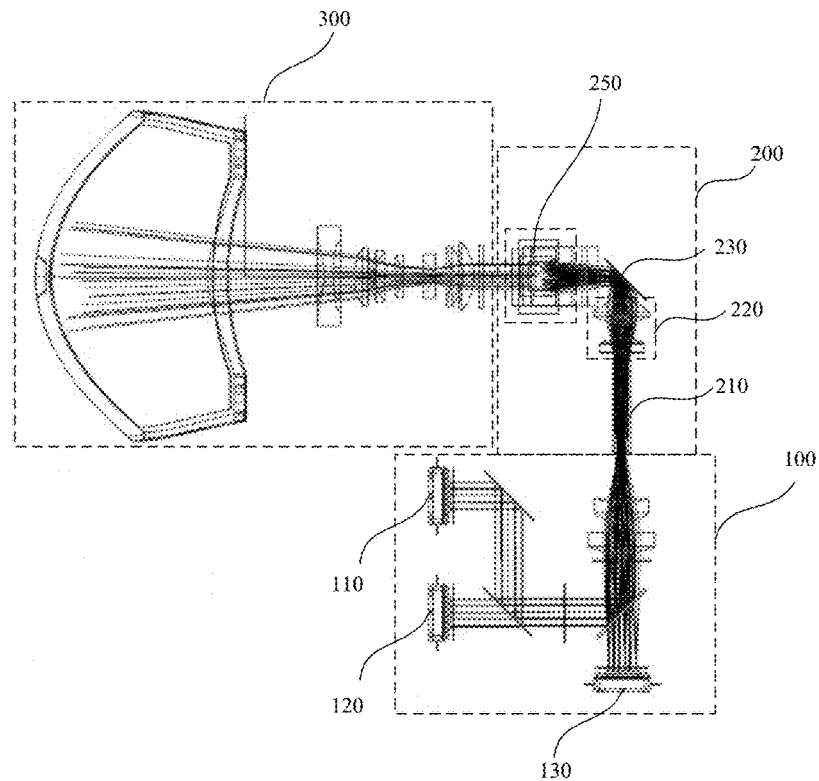
FIG. 2 is a schematic diagram of a laser source, an optical modulating assembly, and a projection lens in a laser projection apparatus, in accordance with some embodiments of the present disclosure.
Figure 7A:
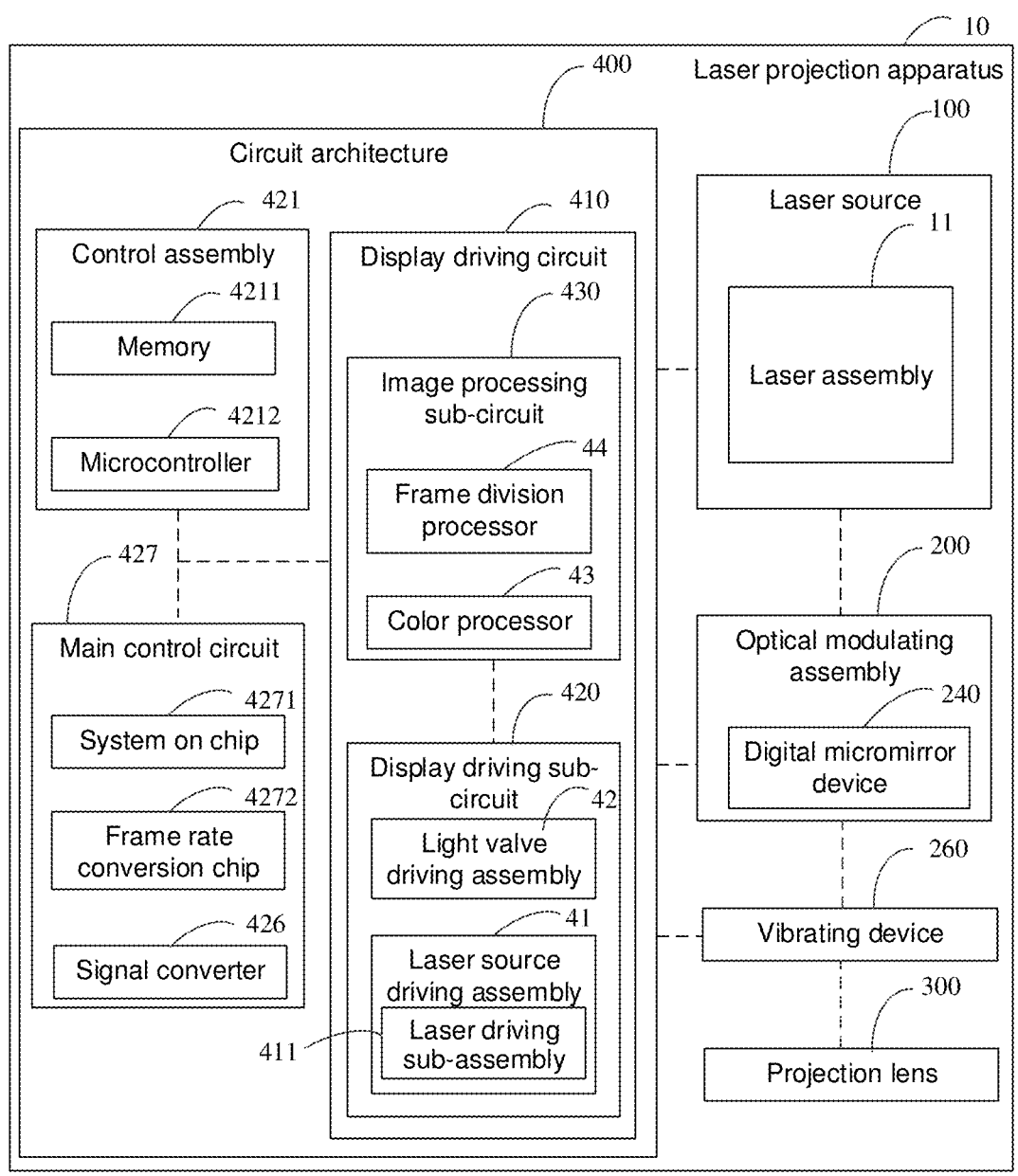
FIG. 7A is a block diagram of a laser projection apparatus, in accordance with some embodiments of the present disclosure.

In some embodiments, as shown in FIGS. 2 and 7A, the laser source 100 includes a laser assembly 11, and the laser assembly 11 may include three laser arrays. For example, the three laser arrays may be a red laser array 130, a green laser array 120, and a blue laser array 110, respectively. However, it is not limited thereto. The three laser arrays may also be all blue laser arrays 110, or two laser arrays may be blue laser arrays 110 and one laser array may be a red laser array 130. In a case where a plurality of lasers included in the laser source 100 can generate three primary colors, the laser source 100 can generate illumination beams of three primary colors. Therefore, there is no need to provide a phosphor wheel in the laser source 100 (in a case where one or more laser arrays included in the laser source 100 can only generate laser beams of one or two colors, the laser beams of existing colors need to be used to excite the phosphor wheel to generate fluorescent beams of other colors, so that the laser beams and the fluorescent beams together form white beams). As a result, a structure of the laser source 100 may be simplified, and a size of the laser source 100 may be reduced.

In some embodiments, the laser assembly 11 of the laser source 100 includes two laser arrays. In an example where the laser source 100 is a two-color laser source, the two laser arrays may be a blue laser array 110 and a red laser array 130. The two laser arrays may also be both blue laser arrays 110, that is, the laser source 100 may be a single-color laser source.

Figure 7B:
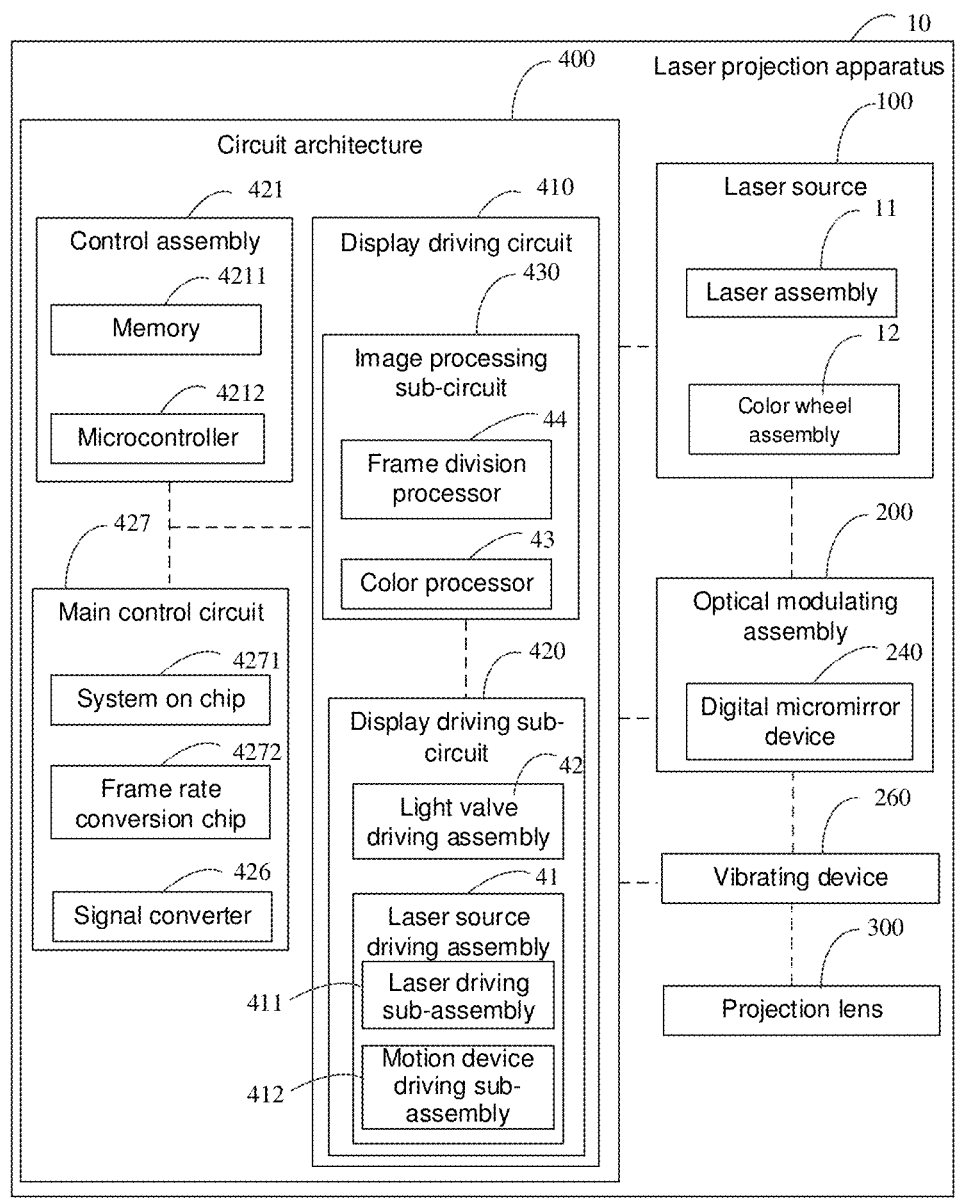
FIG. 7B is a block diagram of another laser projection apparatus, in accordance with some embodiments of the present disclosure.

In some embodiments, referring to FIG. 7B, the laser source 100 further includes a color wheel assembly 12. The color wheel assembly 12 is configured to be matched with the laser assembly 11 and receive the illumination beams from the laser assembly 11. For example, a light-exit side of the laser assembly 11 is aligned with a light inlet side of the color wheel assembly 12.

Figure 4:
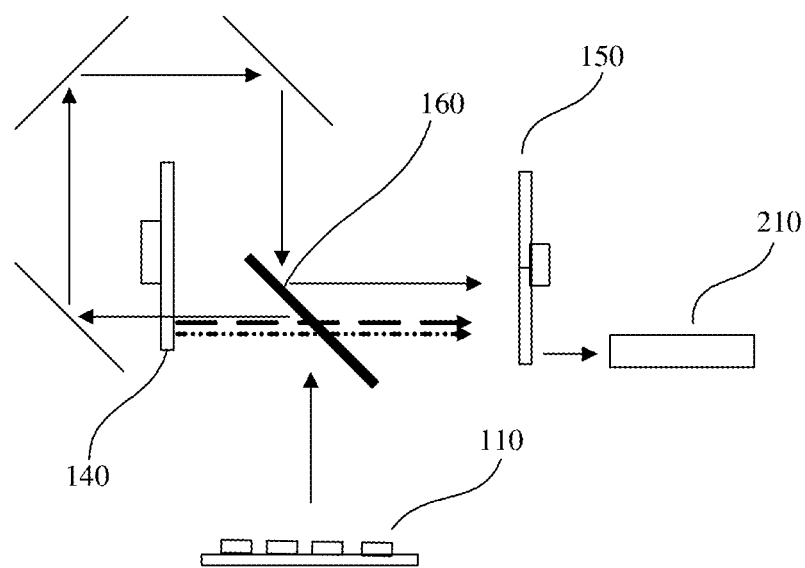
FIG. 4 is a schematic diagram showing a principle of a beam path of a laser source in a laser projection apparatus, in accordance with some embodiments of the present disclosure.
Figure 5:
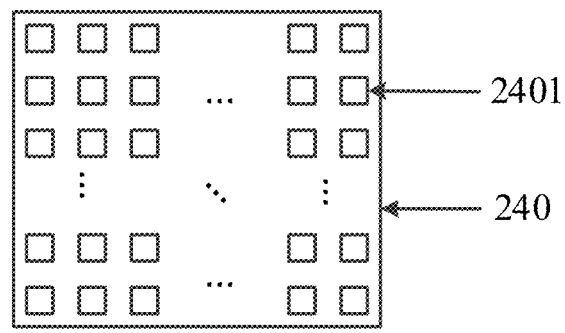
FIG. 5 is a diagram showing an arrangement of micromirrors in a digital micromirror device, in accordance with some embodiments of the present disclosure.

The laser source 100 may include one laser array, that is, the laser source 100 may be a single-color laser source. In the single-color laser source, referring to FIG. 4, the one laser array may be a blue laser array 110. In addition, the color wheel assembly 12 of the laser source 100 may further include a fluorescent wheel 140 and a filter wheel 150. After the blue laser array 110 emits blue beams, a part of the blue beams irradiate the fluorescent wheel 140 to generate red fluorescent beams (in a case where the laser source 100 includes a red laser array 130, there is no need to generate red fluorescent beams) and green fluorescent beams. Then, the blue laser beams, the red fluorescent beams (or red laser beams), and the green fluorescent beams pass through a beam combination mirror 160 in turn, and then pass through the color filter wheel 150 to be filtered. And finally, beams of three primary colors are output sequentially. According to a phenomenon called persistence of vision, the human eyes are unable to distinguish a color of a beam at an exact moment, and what are perceived by the human eyes are still mixed white beams.

Figure 3:
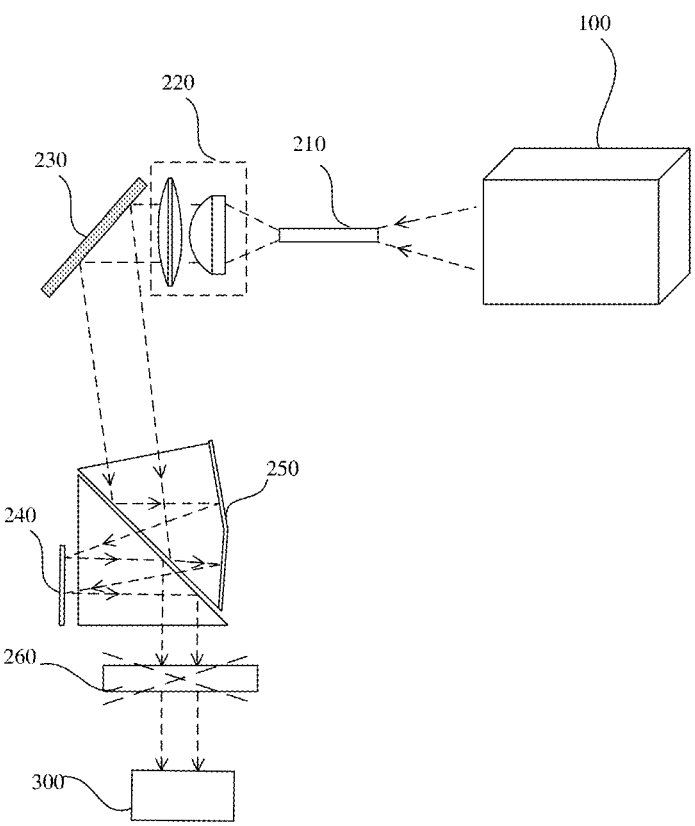
FIG. 3 is an architecture diagram of a beam path in a laser projection apparatus, in accordance with some embodiments of the present disclosure.

The illumination beams emitted by the laser source 100 enter the optical modulating assembly 200. Referring to FIGS. 2 and 3, the laser projection apparatus 10 further includes a vibrating device 260. The optical modulating assembly 200 may include a digital micromirror device 240. The vibrating device 260 is matched with the digital micromirror device 240 and disposed on a light-exit side of the digital micromirror device 240, so as to receive the illumination beams modulated by the digital micromirror device 240 and perform corresponding vibrations in multiple directions. The optical modulating assembly 200 is configured to modulate the illumination beams provided by the laser source 100 based on image signals to obtain projection beams.

In some embodiments of the present disclosure, the optical modulating assembly 200 may further include a light homogenizing assembly 210, a lens assembly 220, a reflector 230, and a prism assembly 250. The light homogenizing assembly 210 may receive the illumination beams provided by the laser source 100 and homogenize the illumination beams. For example, the light homogenizing assembly 210 may be a light pipe or a compound eye lens set. The lens assembly 220 may first amplify the illumination beams, then converge the illumination beams, and finally emit the illumination beams to the reflector 230. The reflector 230 may reflect the illumination beams to the prism assembly 250. The prism assembly 250 reflects the illumination beams to the digital micromirror device 240. The digital micromirror device 240 modulates the illumination beams and reflects the projection beams obtained after modulation into the projection lens 300.

Figure 8:
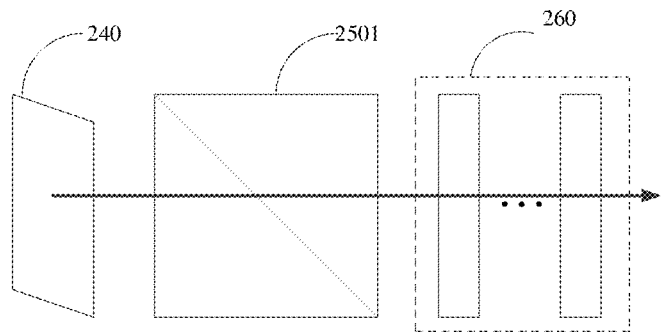
FIG. 8 is an architecture diagram of a beam path of image signal of each sub-image, in accordance with some embodiments of the present disclosure.
Figure 12:
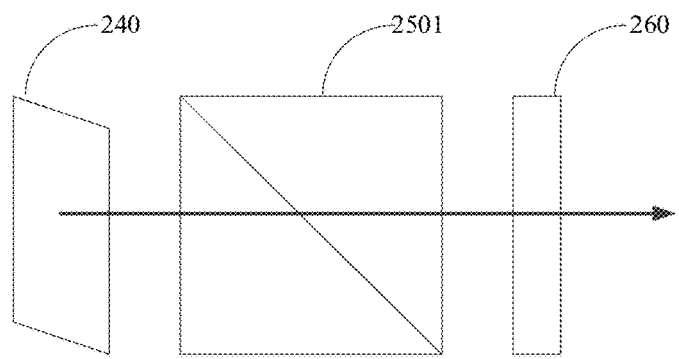
FIG. 12 is an architecture diagram of another beam path of image signal of each sub-image, in accordance with some embodiments of the present disclosure.

In some embodiments, the prism assembly 250 further includes a lens 2501, and the lens 2501 is disposed to be matched with the digital micromirror device 240, as shown in FIGS. 8 and 12. The lens 2501 is located between the digital micromirror device 240 and the vibrating device 260. The lens 2501 may be a total internal reflection (TIR) lens. The TIR lens utilizes the principle of total reflection and may collect light. Therefore, the modulated projection beams may be relatively completely transmitted to the vibrating device 260, thereby avoiding transmission loss effectively.

The vibrating device 260 is configured to rotate the lens thereof to transmit and deflect the projection beams in response to vibrating lens driving current. In a case where the vibrating device 260 transmits the projection beams, the rotation angle of the lens is different at different times, so that the beams are displaced at different times, and then light spots are misaligned, so as to form misaligned beams. In this way, the misaligned beam will be incident in the projection lens 300, so that misaligned and superimposed images will appear on the projection screen. Due to the phenomenon of persistence of human vision, if the misaligned and superimposed images are related, visually, the amount of information in the images will increase and the clarity will be improved, thereby achieving the effect of resolution improvement.

In some embodiments, the vibrating device 260 includes a plurality of vibrating lenses. Referring to FIG. 8, the plurality of vibrating lenses are matched with the digital micromirror device 240 and are arranged in sequence. A type of each vibrating lens may be a two-dimensional vibrating lens or a multi-dimensional vibrating lens. In a case where the prism assembly 250 further includes a lens 2501, the lens 2501 is located between the digital micromirror device 240 and one of the plurality of vibrating lenses closest to the digital micromirror device 240. The lens 2501 is configured to transmit the projection beams modulated by the digital micromirror device 240 to the plurality of vibrating lenses of the vibrating device 260.

In some embodiments, the vibrating device 260 includes at least one multi-dimensional vibrating lens. Referring to FIG. 12, the vibrating device 260 only includes a multi-dimensional vibrating lens, and the multi-dimensional vibrating lens is disposed at the light-exit side of the digital micromirror device 240. In a case where the prism assembly 250 further includes a lens 2501, the lens 2501 is located between the digital micromirror device 240 and the multi-dimensional vibrating lens. A type of the multi-dimensional vibrating lens may be selected from four-dimensional vibrating lenses, six-dimensional vibrating lenses, eight-dimensional vibrating lenses, sixteen-dimensional vibrating lenses, and other vibrating lenses with more than two dimensions. In other words, the vibrating device 260 may perform vibrations in four, six, eight, sixteen, or other number (more than two) of directions in sequence.

A vibration level of the vibrating device 260 is related to the type and number of the vibrating lenses included. For example, if the vibrating device 260 includes a two-dimensional vibrating lens and a four-dimensional vibrating lens, the vibration level of the vibrating device 260 is eight, and the vibrating device 260 may vibrate in eight directions. For another example, if the vibrating device 260 includes an eight-dimensional vibrating lens, the vibration level of the vibrating device 260 is eight, and the vibrating device 260 may vibrate in eight directions. Then, based on different optical design requirements, the type and number of the vibrating lenses are set, and then the vibrating lenses are controlled to perform multi-level vibration, so as to perform vibrations in at least two directions on the projection beams obtained after the modulation of the digital micromirror device 240.

In the optical modulating assembly 200, the digital micromirror device 240 is a core component, and the digital micromirror device 240 functions to modulate the illumination beams provided by the laser source 100 by using the image signals, that is, to control the illumination beams to display different colors and brightness for different pixels of the image to be displayed, so as to finally form an optical image. Therefore, the digital micromirror device 240 is also referred to as an optical modulator or a light valve. Depending on whether the optical modulator (or the light valve) transmits or reflects the illumination beams, the optical modulator (or the light valve) may be classified as a transmissive optical modulator (or light valve) or a reflective optical modulator (or light valve). For example, the digital micromirror device 240 shown in FIGS. 2 and 3 reflects the illumination beams, and thus the digital micromirror device is a reflective optical modulator. A liquid crystal light valve transmits the illumination beams, and thus the liquid crystal light valve is a transmissive optical modulator. In addition, according to the number of the light valve, the optical modulating assembly 200 may be classified as a single-chip system, a double-chip system, or a three-chip system. For example, only one digital micromirror device 240 is used in the optical modulating assembly 200 shown in FIGS. 2 and 3, and thus the optical modulating assembly 200 may be referred to as a single-chip system. In a case where three digital micromirror devices 240 are used, the optical modulating assembly 200 may be referred to as the three-chip system.

Figure 15:
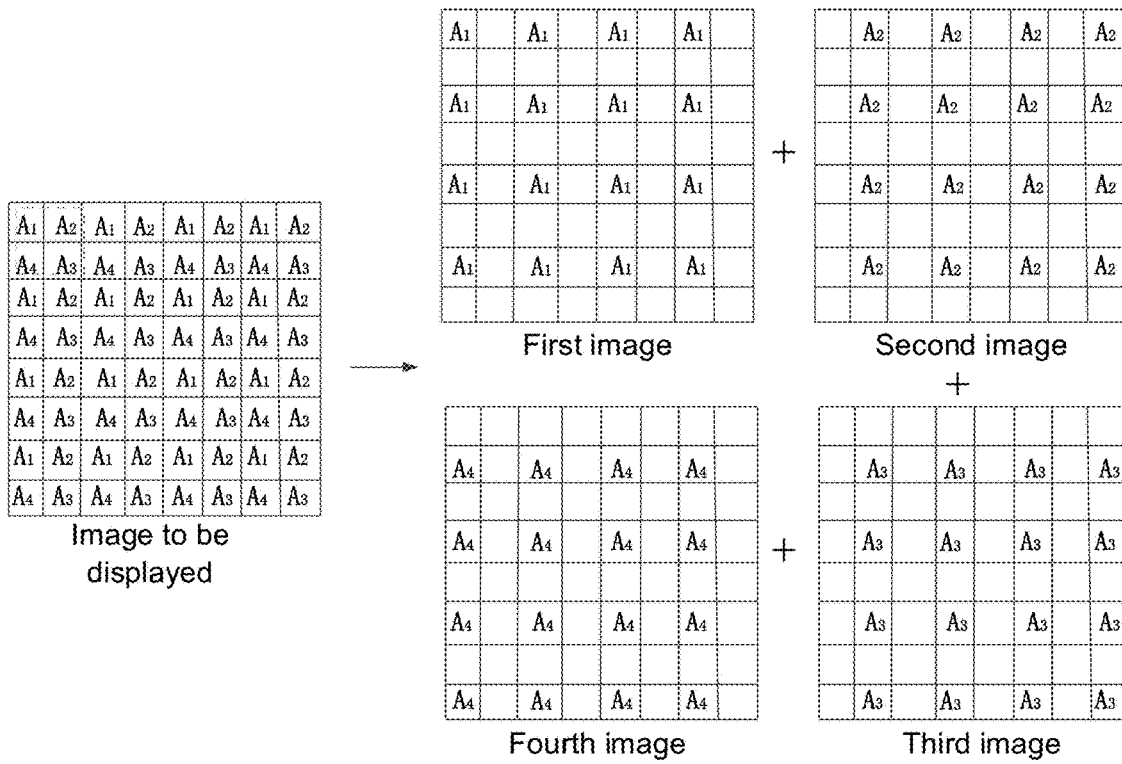
FIG. 15 is a schematic diagram of yet another frame division method, in accordance with some embodiments of the present disclosure.

The digital micromirror device 240 is applied in a digital light processing (DLP) projection architecture. The optical modulating assembly 200 shown in FIGS. 2 and 3 uses the DLP projection architecture. As shown in FIG. 15, the digital micromirror device 240 includes thousands of micromirrors 2401 that may be individually driven to rotate. These micromirrors 2401 are arranged in an array, and each micromirror 2401 is configured to reflect one pixel in the image to be displayed. In the DLP projection architecture, each micro-mirror 2401 is equivalent to a digital switch and can swing within a range of plus or minus 12 degrees (i.e., ±12°) or a range of plus or minus 17 degrees (i.e., ±17°) due to an action of an external electric field. In this way, the reflected beams may be imaged on a screen through the projection lens 300 along an optical axis direction to form a bright pixel.

Figure 6:
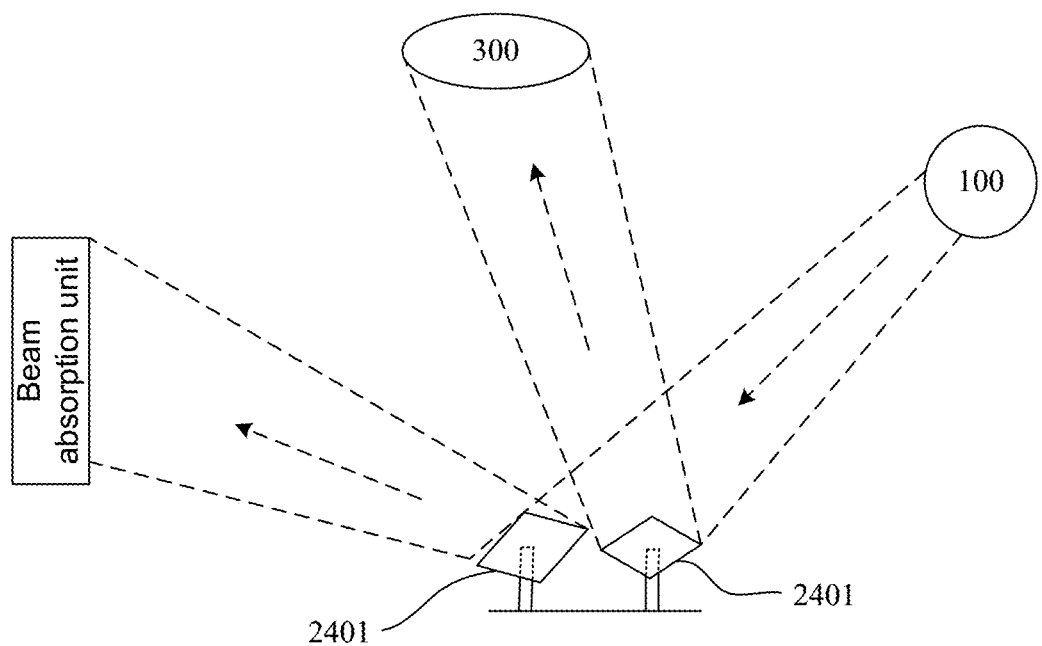
FIG. 6 is a schematic diagram showing an operation of micromirrors, in accordance with some embodiments of the present disclosure.

As shown in FIG. 6, a beam reflected by a micromirror 2401 at a negative deflection angle is referred to as an OFF beam, which is an ineffective beam, and usually hits the apparatus housing 101 and the housing of the optical modulating assembly 200 or is absorbed by a beam absorption unit. A beam reflected by a micromirror 2401 at a positive deflection angle is referred to as an ON beam, which is an effective beam entering the projection lens 300 in a case where the micromirror 2401 on a surface of the digital micromirror device 240 is irradiated by an illumination beam and reflected at a positive deflection angle and is used for projection imaging. An ON state of the micromirror 2401 is a state that the micromirror 2401 is in and may be maintained in a case where the illumination beams emitted by the laser source 100 may enter the projection lens 300 after being reflected by the micromirror 2401. That is, the micromirror 2401 is in a state of the positive deflection angle. An OFF state of the micromirror 2401 is a state that the micromirror 2401 is in and may be maintained in a case where the illumination beams emitted by the laser source 100 do not enter the projection lens 300 after being reflected by the micromirror 2401. That is, the micromirror 2401 is in a state of the negative deflection angle. For example, a state at +12° is the ON state, and a state at −12° is the OFF state. The image signals are converted into digital codes such as 0 or 1 after being processed, and these digital codes may drive the micromirrors 2401 to swing.

In a display cycle of a frame of image, part or all of the micromirrors 2401 may be switched once between the ON state and the OFF state, so that gray scales of pixels in the frame of image are achieved according to durations that the micromirrors 2401 are in the ON state and the OFF state. For example, in a case where the pixels have 256 gray scales from 0 to 255, micromirrors 2401 corresponding to a gray scale 0 are each in the OFF state in an entire display cycle of the frame of the image, micromirrors 2401 corresponding to a gray scale 255 are each in the ON state in the entire display cycle of the frame of the image, and micromirrors 2401 corresponding to a gray scale 127 are each in the ON state for a half of time and in the OFF state for another half of time in the display cycle of the frame of the image. Therefore, by controlling a state that each micromirror 2401 in the digital micromirror device 240 is in and a duration of each state in the display cycle of a frame of image with image signals, luminance (the gray scale) of a pixel corresponding to the micromirror 2401 may be controlled, and a purpose of modulating the illumination beams projected onto the digital micromirror device 240 may be achieved.

The light homogenizing assembly 210, the lens assembly 220, and the reflector 230 at a front end of the digital micromirror device 240 form an illumination path, and the illumination beams emitted by the laser source 100 pass through the illumination path to have a size and an incident angle which meet the requirements of the digital micromirror device 240.

In some embodiments of the present disclosure, as shown in FIG. 2, the projection lens 300 includes a combination of a plurality of lenses, which are usually divided by groups and are divided into a three-segment combination including a front group, a middle group, and a rear group, or a two-segment combination including a front group, and a rear group. The front group is a lens group proximate to a light-exit side (a left side shown in FIG. 2) of the laser projection apparatus, and the rear group is a lens group proximate to a laser-exit side (a right side shown in FIG. 2) of the optical modulating assembly 200. According to the above combinations of various lens groups, the projection lens 300 may be a zoom projection lens, or a prime focus-adjustable projection lens, or a prime projection lens. In some embodiments, the laser projection apparatus 10 is an ultra-short-focus projection apparatus, and the projection lens 300 is an ultra-short-focus lens. A throw ratio of the projection lens 300 is usually less than 0.3, such as, for example, 0.24. The projection ratio refers to a ratio of a projection distance to a width of an image. The smaller the ratio, the larger the width of the projection image at a same projection distance. The ultra-short-focus projection lens with a small projection ratio may adapt to a narrow space while ensuring the projection effect.

In some embodiments of the present disclosure, block diagrams of the laser projection apparatus 10 refer to FIGS. 7A and 7B. In some embodiments, the circuit architecture 400 is configured to control the operation of the laser source 100, the optical modulating assembly 200, and the projection lens 300. In some embodiments, projection lens 300 may further be an electrically controllable optical element. It will be noted that the circuit architecture 400 may be implemented as an integrated circuit board or a separate circuit device, and those skilled in the art can design and implement a physical circuit structure according to the embodiments. Moreover, FIG. 7A and FIG. 7B are only for reference and do not limit the need to differentiate the physical circuit structure according to the requirements in the block diagram. For example, it is also feasible to design an integrated chip to realize the circuit structure in a plurality of blocks, and the detailed circuit structures, such as chips, resistors, capacitors, and I/O interfaces, are not limited.

In some embodiments, as shown in FIGS. 7A and 7B, the circuit architecture 400 includes a display driving circuit 410 coupled to the optical modulating assembly 200 and the laser source 100. The display driving circuit 410 receives the image data of the image to be displayed and performs frame division on the image data of the image to be displayed according to a preset frame division method, thereby obtaining image signals of a plurality of frames of sub-images. The display driving circuit 410 generates a driving control signal according to the image signal of each frame of sub-image. The optical modulating assembly 200 and the laser source 100 receive the image signals of the plurality of frames of sub-images and output the image signals of the plurality of frames of sub-images according to a predetermined output timing sequence based on the driving control signal generated by the display driving circuit 410. The image data in the embodiments of the present disclosure may also be referred to as image signals. Both are numerical representations of a grayscale value of each pixel in the image, and the image or video can be transmitted in the form of numerical values or data.

The preset frame division method performed by the display driving circuit 410 is associated with the optical modulating assembly 200. In some embodiments, the preset frame division method is related to the digital micromirror device 240. For example, referring to FIG. 8 to FIG. 15, the preset frame division method is related to the resolution of the digital micromirror device 240 of the optical modulating assembly 200. The resolution of each frame of sub-image after frame dividing is less than or equal to the resolution of the digital micromirror device 240. That is, the display driving circuit 410 uses the preset frame division method to convert the image data of the image to be displayed into a plurality of frames of sub-images that the digital micromirror device 240 is capable of processing, so that the digital micromirror device 240 has an ability to output each frame of sub-image. For example, a high-resolution image to be displayed is converted into a plurality of low-resolution frames of sub-images. In this way, a high-resolution image to be displayed may still be output without upgrading the digital micromirror device 240.

In some embodiments, the preset frame division method is related to the vibration level of the vibrating device 260. The number of frames of the plurality of frames of sub-images after frame dividing is less than or equal to the vibration level of the vibrating device 260. The number (i.e., the number of frames of the sub-images) of divisions in the preset frame division method is set according to the number of directions in which the vibrating device 260 is capable of vibrating.

In some embodiments, a type of the vibrating device 260 provided in the laser projection apparatus 10 is determined based on the resolution of the image to be displayed and the resolution of the digital micromirror device 240. In this way, a low-resolution digital micromirror device 240 may be used to display a high-resolution image. In a case where the vibrating device 260 is selectable, the type and quantity of the vibrating device 260 to be used are determined based on the resolution of the image to be displayed and the resolution of the digital micromirror device 240, and then the preset frame division method is determined. The display driving circuit 410 receives the preset frame division method, divides the image data of the high-resolution image to be displayed into image signals of a plurality of low-resolution sub-images that the digital micromirror device 240 is capable of displaying, and cooperates with the vibrating device 260 to vibrate in corresponding directions simultaneously, so that the image signal of each frame of sub-image are presented at corresponding positions, thereby realizing the display of high-resolution images.

In some embodiments of the present disclosure, the display driving circuit 410 includes an image processing sub-circuit 430 and a display driving sub-circuit 420. The image processing sub-circuit 430 is configured to perform frame division on received image data of the image to be displayed according to the preset frame division method to obtain the image signals of the plurality of frames of sub-images, generate the driving control signal based on the image signal of each frame of sub-image, and send the driving control signal to the display driving sub-circuit 420.

The display driving sub-circuit 420 is coupled to the image processing sub-circuit 430 and is configured to receive the driving control signal of each frame of sub-image and control the laser source 100 and/or the optical modulating assembly 200 to output the image signal of each frame of sub-image based on the driving control signal. The display driving sub-circuit 420 is configured to output the image signals of the plurality of frames of sub-images to the digital micromirror device 240 according to an output timing of the image signals of the plurality of frames of sub-images based on a frame division control signal and output a vibration instruction to the vibrating device 260 based on the output timing of the image signals of the plurality of frames of sub-images, so as to control the vibrating device 260 to perform vibrations in multiple directions, so that the projection beams corresponding to different image signals of the sub-images are output through vibrations of the vibrating device 260 in sequence. It will be noted that the image signals of the plurality of frames of sub-images are electrical signals. That is, the image signals are driving signals that corresponds to the image signals of the plurality of frames of sub-images and may be directly used to drive the digital micromirror device 240 after conversion.

It will be noted that in some embodiments, the projection beams may be transmitted to the projection lens 300 through the vibrating device 260, or the projection beam may be reflected by the vibrating device 260 and output to the projection lens 300. The present disclosure is not limited thereto.

For example, after the image processing sub-circuit 430 performs the frame division on the received image data of the image to be displayed using the preset frame division method, the number of frames of the obtained sub-images is the same as the number of vibration levels of the vibrating device 260, and the resolution of the image signal of each frame of sub-image is the same as the resolution of the digital micromirror device 240. In some embodiments, after the image processing sub-circuit 430 performs the frame division on the received image data of the image to be displayed using the preset frame division method, the number of frames of the obtained sub-images is less than the number of vibration levels of the vibrating device 260, and the resolution of the image signal of each frame of sub-image is less than the resolution of the digital micromirror device 240.

In some embodiments, as shown in FIGS. 7A and 7B, the image processing sub-circuit 430 includes a frame division processor 44. The frame division processor 44 performs the frame division on the image data of the image to be displayed according to the preset frame division method to obtain the image signals of the plurality of frames of sub-images, generates a frame division control signal based on the image signal of each sub-image, and sends the frame division control signal to the display driving sub-circuit. The display driving sub-circuit 420 receives the frame division control signal and outputs the image signal of each frame of sub-image to the optical modulating assembly 200 based on the frame division control signal. The digital micromirror device 240 outputs the image signal of each frame of sub-image based on the frame division control signal corresponding to each frame of sub-image according to the output timing of the image signal of each frame of sub-image. Based on the output timing of the image signal of each frame of sub-image, the vibrating device 260 performs vibrations in the corresponding directions, so that the projection beam of each frame of sub-image is transmitted and output through the vibrating device 260, and then the image signals of the plurality of frames of sub-images processed by multi-level vibration are jointly projected and displayed.

In some embodiments, in a case where the vibrating device 260 includes a plurality of vibrating lenses, refer to the optical path diagram of the image signal of each frame of sub-image provided in FIG. 8. According to the preset frame division method of the frame division processor 44, if the resolution of the image to be displayed is $P \times Q$ and the resolution of the digital micromirror device 240 is $X \times Y$, the frame division processor 44 of the image processing sub-circuit 430 may first divide the image data of the image to be displayed with the resolution of $P \times Q$ into image data of k frames of images with a resolution of $M \times N$, and then divide image data of each frame of image with a resolution of $M \times N$ into image data of f frames of images with a resolution of $A \times B$, so as to obtain image data of $k \times f$ frames of images with the resolution of $A \times B$, and then divide image data of each frame of image with a resolution of $A \times B$ into image data of g frames of images with a resolution of $C \times D$, so as to obtain image data of $k \times f \times g$ frames of images with the resolution of $C \times D$. The foregoing is followed by analogy until the image data of $k \times f \times g \times n$ (n may be any positive integer or a product of a plurality of positive integers) frames of images with a resolution of $X \times Y$ is finally obtained, which is an image signal of a final sub-image. During the entire frame division process, the relationship between the sub-images and the image to be displayed satisfies $k \times f \times g \times n \times X \times Y = P \times Q$. In some embodiments, the frame number $k \times f \times g \times n$ of the sub-images is less than or equal to the vibration levels of the vibrating device 260.

In some embodiments, referring to FIGS. 8 to 10, in a case where the vibrating device 260 includes three two-dimensional vibrating lenses, the preset frame division method and the process in which the frame division processor 44 uses the preset frame division method to perform frame division on the image data of the image to be displayed will be illustrated below by taking an example in which the resolution of the image to be displayed is $8 \times 1920 \times 1080$, and the resolution of the digital micromirror device 240 is $1920 \times 1080$.

Figure 9:
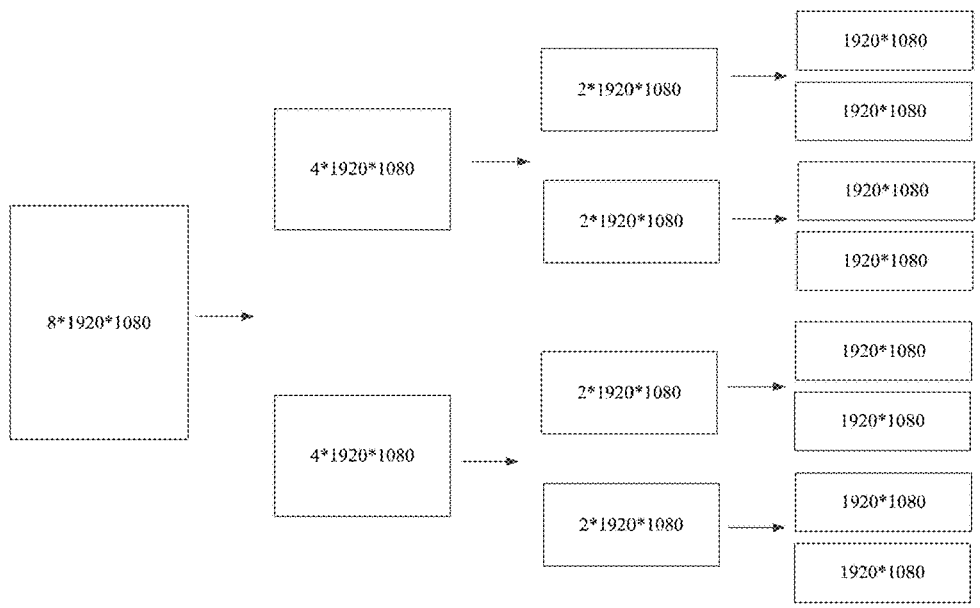
FIG. 9 is a flow chart of a frame division method, in accordance with some embodiments of the present disclosure.

As shown in FIG. 9, the frame division processor 44 may first divide the image to be displayed into two frames of images with a resolution of 4×1920×1080, and then divide the two frames of images with the resolution of 4×1920×1080 into two frames of images with a resolution of 2×1920×1080, respectively, to obtain four frames of images with the resolution of 2×1920×1080, and then divide the four frames of images with the resolution of 2×1920×1080 into two frames of images with a resolution of 1920×1080, respectively, so that eight sub-images with the resolution of 1920×1080 are obtained. The resolution of each sub-image is the same as the resolution of the digital micromirror device 240.

Figure 10:
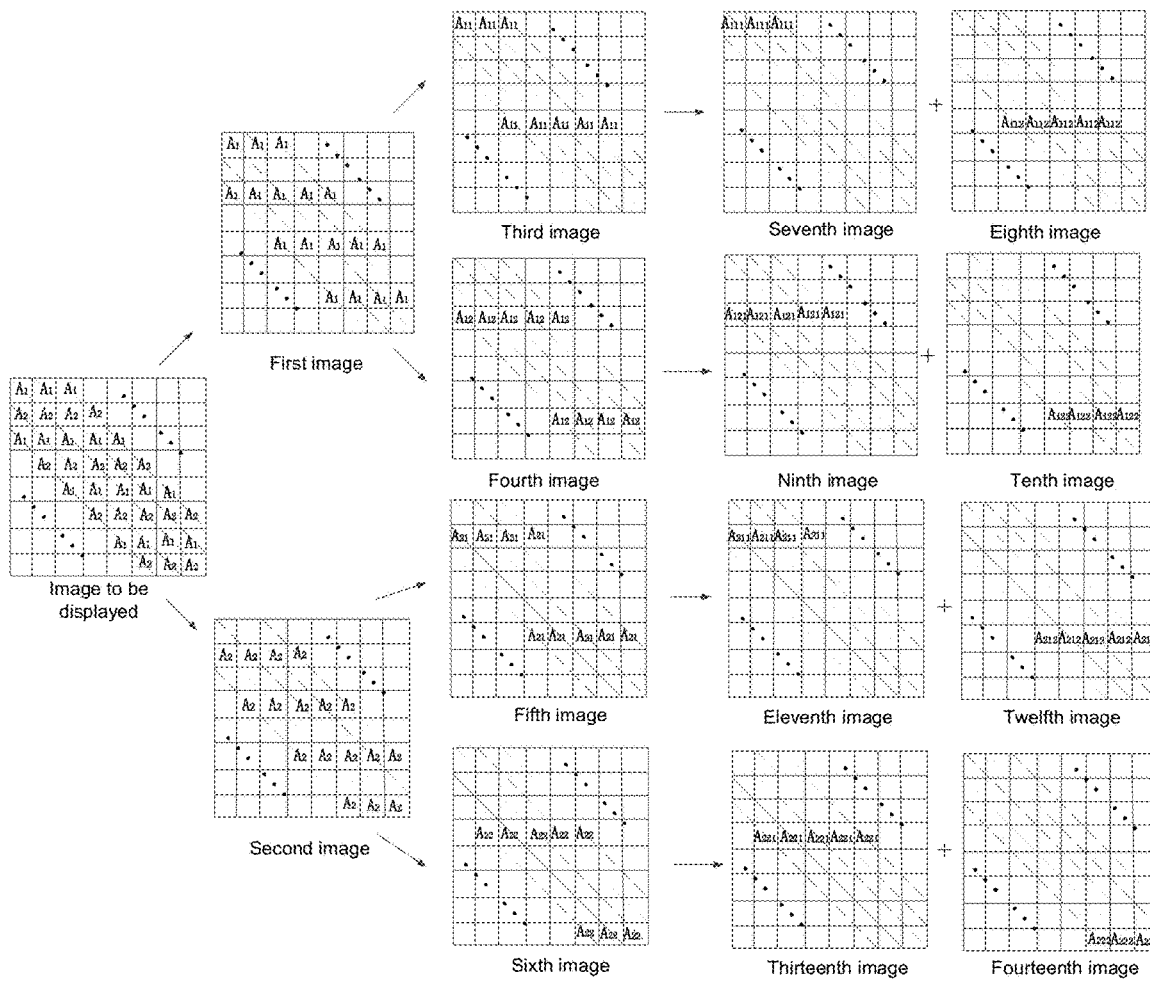
FIG. 10 is a schematic diagram of a frame division method, in accordance with some embodiments of the present disclosure.

In FIG. 10, a grid image is used instead of image data to schematically illustrate how to perform the frame division on the image data of the image to be displayed. As shown in FIG. 10, first, two diagonally adjacent pixels in the image to be displayed with the resolution of 8×1920×1080 may be divided into $A_1$ pixels and $A_2$ pixels, respectively, so as to obtain a first image composed of the $A_1$ pixels and a second image composed of the $A_2$ pixels. And the resolutions of the first image and the second image are both 4×1920×1080.

Next, two diagonally adjacent pixels in the first image may be divided into $A_{11}$ pixels and $A_{12}$ pixels, respectively, to obtain a third image composed of the $A_{11}$ pixels and a fourth image composed of the $A_{12}$ pixels, and the resolutions of the third image and the fourth image are both 2×1920×1080. Correspondingly, two diagonally adjacent pixels in the second image are divided into $A_{21}$ pixels and $A_{22}$ pixels, respectively, to obtain a fifth image composed of the $A_{21}$ pixels and a sixth image composed of the $A_{22}$ pixels, and the resolutions of the fifth image and the six image are both 2×1920×1080.

Finally, two diagonally adjacent pixels in the third image may be divided into $A_{111}$ pixels and $A_{112}$ pixels, respectively, to obtain a seventh image composed of the $A_{111}$ pixels and an eighth image composed of the $A_{112}$ pixels, and the resolutions of the seventh image and the eight image are both 1920×1080. Two obliquely adjacent pixels in the fourth image are divided into $A_{121}$ pixels and $A_{122}$ pixels, respectively, to obtain a ninth image composed of the $A_{121}$ pixels and a tenth image composed of the $A_{122}$ pixels, and the resolutions of the ninth image and the tenth image are both 1920×1080. Correspondingly, two diagonally adjacent pixels in the fifth image are divided into $A_{211}$ pixels and $A_{212}$ pixels, respectively, to obtain an eleventh image composed of the $A_{211}$ pixels and a twelfth image composed of the $A_{212}$ pixels, and the resolutions of the eleventh image and the twelfth image are both 1920×1080. Two diagonally adjacent pixels in the sixth image are divided into $A_{221}$ pixels and $A_{222}$ pixels, respectively, to obtain a thirteenth image composed of all $A_{221}$ pixels and a fourteenth image composed of all $A_{222}$ pixels, and the resolutions of the thirteenth image and the fourteenth image are both 1920×1080. Image data of the seventh image to the fourteenth image with the resolution of 1920×1080 is the image data of the eight frames of sub-images finally obtained through the frame division process, which is the image signal of the final sub-image.

In some embodiments, in a case where the vibrating device 260 includes a two-dimensional vibrating lens and a four-dimensional vibrating lens, the frame division processor 44 may first divide the image to be displayed with the resolution of 8×1920×1080 into two frames of images with the resolution of 4×1920×1080 and then divide the two frames of images with the resolution of 4×1920×1080 into four frames of images with the resolution of 1920×1080, respectively, so as to obtain eight frames of sub-images with the resolution of 1920×1080.

Figure 11:
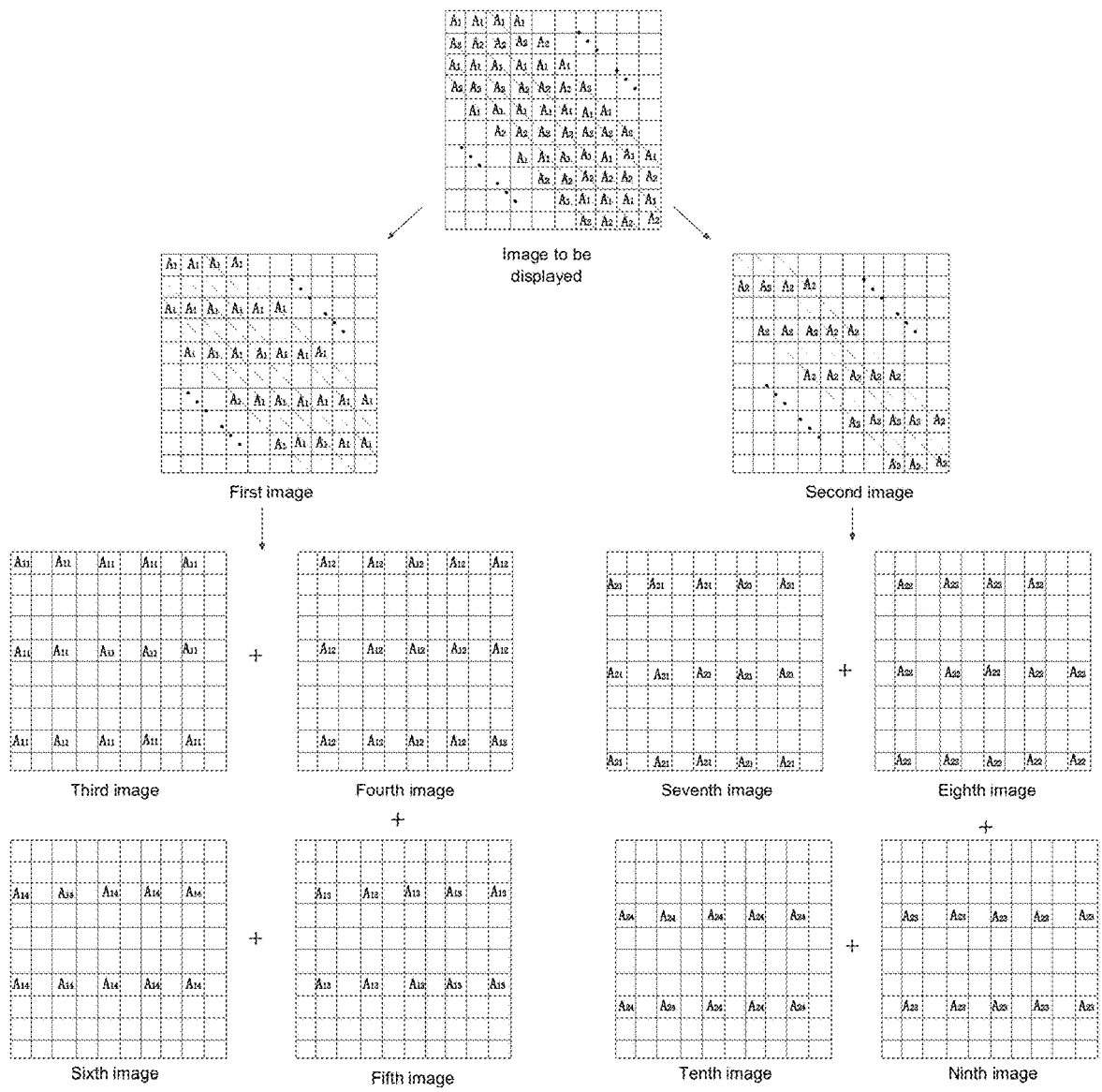
FIG. 11 is a schematic diagram of another frame division method, in accordance with some embodiments of the present disclosure.

As shown in FIG. 11, in a case where performing frame division on the image to be displayed with the resolution of 8×1920×1080, first, two diagonally adjacent pixels in the image to be displayed with the resolution of 8×1920×1080 may be divided into $A_1$ pixels and $A_2$ pixels, respectively, so as to obtain a first image composed of the $A_1$ pixels and a second image composed of the $A_2$ pixels. And the resolutions of the first image and the second image are both 4×1920×1080. Next, four adjacent pixels in the first image along an up-down direction and a left-right direction are divided into $A_{11}$ pixels, $A_{12}$ pixels, $A_{13}$ pixels and $A_{14}$ pixels, respectively, so as to obtain a third image to a sixth image that are respectively composed of the $A_{11}$ pixels, the $A_{12}$ pixels, the $A_{13}$ pixels, and the $A_{14}$ pixels with the resolutions of 1920×1080. Four adjacent pixels in the second image along the up-down direction and the left-right direction are divided into $A_{21}$ pixels, $A_{22}$ pixels, $A_{23}$ pixels, and $A_{24}$ pixels, respectively, so as to obtain a seventh image to a tenth image that are respectively composed of the $A_{21}$ pixels, the $A_{22}$ pixels, the $A_{23}$ pixels, and the $A_{24}$ pixels with the resolutions of 1920×1080. The third image to the tenth image with the resolution of 1920×1080 are the eight-frames of sub-images finally obtained through the frame division process.

In some embodiments, in a case where the vibrating device 260 includes two two-dimensional vibrating lenses, the frame division processor 44 may first divide the image data of the image to be displayed with the resolution of 8×1920×1080 into the image data of two frames of images with the resolution of 4×1920×1080 and then divide the image data of the two frames of images with the resolution of 4×1920×1080 into the image data of two frames of images with a resolution of 2715×1527, so that image signal of four frames of sub-images with the resolution of 2715×1527 is obtained.

Similarly, in a case where frame division is performed on the image to be displayed with the resolution of 8×1920×1080, two diagonally adjacent pixels in the image data of the image to be displayed may be divided into $A_1$ pixels and $A_2$ pixels, respectively, so as to obtain a first image composed of the $A_1$ pixels and a second image composed of the $A_2$ pixels. And the resolutions of the first image and the second image are both 4×1920×1080. Next, two diagonally adjacent pixels in the first image are divided into $A_{11}$ pixels and $A_{12}$ pixels, respectively, to obtain a third image and a fourth image respectively composed of the $A_{11}$ pixels and the $A_{12}$ pixels with the resolution of 2715×1527. Two diagonally adjacent pixels in the second image are divided into $A_{21}$ pixels and $A_{22}$ pixels, respectively, to obtain a fifth image and a sixth image respectively composed of the pixels $A_{21}$ and the $A_{22}$ pixels with the resolution of 2715×1527. The image data of the third image to the sixth image with the resolution of 2715×1527 are the four frames of sub-images finally obtained through the frame division process.

In some embodiments, referring to FIGS. 12 to 15, in a case where the vibrating device 260 includes a multi-dimensional vibrating lens, the preset frame division method of the frame division processor 44 is related to a type of the multi-dimensional vibrating lens. During projection display, the frame division processor 44 divides the image data of the high-resolution image into image signals of low-resolution sub-images that the digital micromirror device 240 is capable of displaying and then cooperates with the multi-dimensional vibrating lens to perform vibration in corresponding directions, so that the image signal of each frame of sub-image is presented at a corresponding position, thereby realizing the display of high-resolution image.

In some embodiments, the preset frame division method may be predetermined based on the type of the provided multi-dimensional vibrating lens, and the resolution of each frame of sub-image is consistent with the resolution of the digital micromirror device 240, so that the number of frames of the sub-images obtained through the frame division may be consistent with the vibration levels of the vibrating device 260. For example, the resolution of the image to be displayed is 8×1920×1080, the resolution of the digital micromirror device 240 is 1920×1080, and the type of the multi-dimensional vibrating lens is an eight-dimensional vibrating lens. The vibration level of the eight-dimensional vibrating lens is eight. That is, it may vibrate in eight directions in sequence, so that the corresponding preset frame division method may be determined.

Figure 13:
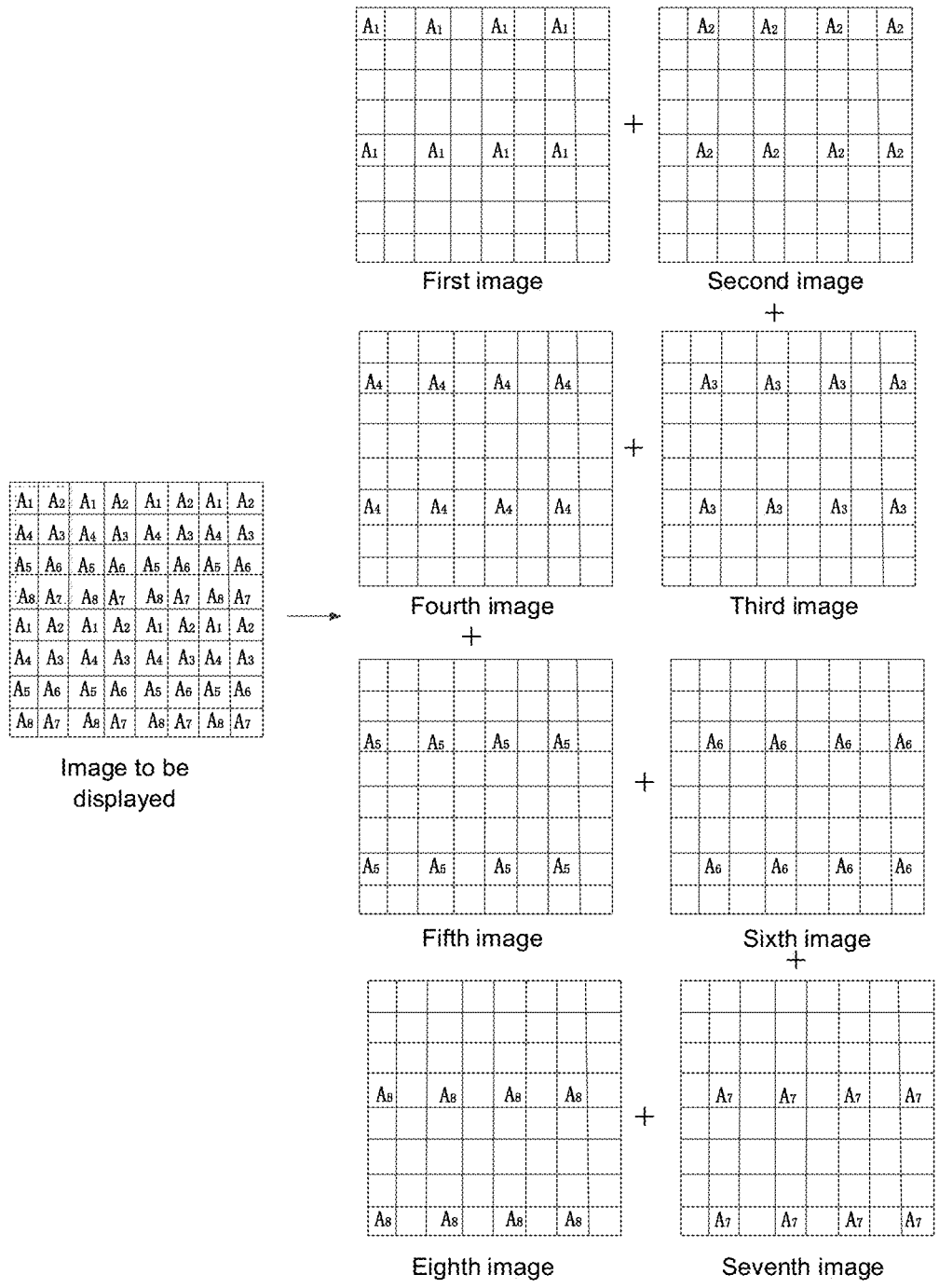
FIG. 13 is a schematic diagram of yet another frame division method, in accordance with some embodiments of the present disclosure.
Figure 14:
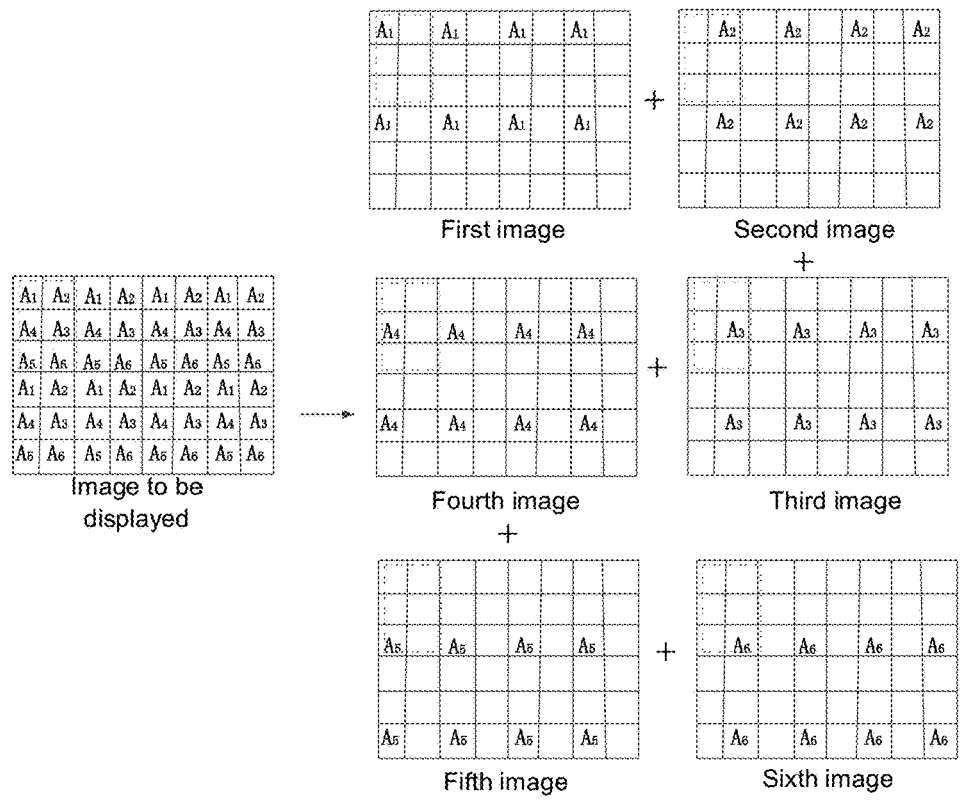
FIG. 14 is a schematic diagram of yet another frame division method, in accordance with some embodiments of the present disclosure.

In FIGS. 13 to 15, the image data is replaced by a grid image for schematically illustrating that the frame division processor 44 performs the frame division on the image data of the image to be displayed.

For example, if the resolution of the image to be displayed is K×X×Y and the resolution of the digital micromirror device 240 is X×Y, the preset frame division method includes that the image data of the image to be displayed with the resolution of K×X×Y is divided into α units. Each unit includes K pixels, and each sub-image contains a pixel located at same positions in all α units. That is, the image data of the image to be displayed with the resolution of K×X×Y may be divided into image data of K frames of sub-images, and the image data of each sub-image is composed of pixels located at the same positions in α units.

For example, as shown in FIG. 13, in a case where the resolution of the image to be displayed is 8×1920×1080, the image data of the image to be displayed may be divided into a plurality of units according to a 4×2 matrix $$\begin{bmatrix} A_1 & A_2 \\ A_4 & A_3 \\ A_5 & A_6 \\ A_8 & A_7 \end{bmatrix},$$

and each unit includes eight pixels.

After frame dividing, a first image composed of all $A_1$ pixels, a second image composed of all $A_2$ pixels, a third image composed of all A3 pixels, a fourth image composed of all A4 pixels, a fifth image composed of all A5 pixels, a sixth image composed of all A6 pixels, a seventh image composed of all A7 pixels, and an eighth image composed of all A8 pixels are obtained. The image data of the first image to the eighth image is the image signals of the eight frames of sub-images obtained through frame division process, and the resolutions of the eight frames of sub-images are all 1920×1080.

In some embodiments, as shown in FIG. 14, in a case where the resolution of the image to be displayed is 6×1920×1080, the image data of the image to be displayed may be divided into a plurality of units according to a 3×2 matrix $$\begin{bmatrix} A_1 & A_2 \\ A_4 & A_3 \\ A_5 & A_6 \end{bmatrix},$$

and each unit includes six pixels.

After frame dividing, a first image composed of all A1 pixels, a second image composed of all A2 pixels, a third image composed of all A3 pixels, a fourth image composed of all A4 pixels, a fifth image composed of all A5, and a sixth image composed of all A6 pixels are obtained. The image data of the first image to the sixth image is the image signals of the six frames of sub-images obtained through frame division process, and the resolutions of the six frames of sub-images are all 1920×1080.

In some embodiments, as shown in FIG. 15, in a case where the resolution of the image to be displayed is 4×1920× 1080, the image data of the image to be displayed may be divided into a plurality of units according to a 2×2 matrix $$\begin{bmatrix} A_1 & A_2 \\ A_4 & A_3 \end{bmatrix},$$

and each unit includes four pixels.

After frame dividing, a first image composed of all $A_1$ pixels, a second image composed of all $A_2$ pixels, a third image composed of all A3 pixels, and a fourth image composed of all A4 pixels are obtained. The image data of the first image to the fourth image is the image signals of the four frames of sub-images obtained through frame division process, and the resolutions of the four frames of sub-images are all 2715×1527.

In some embodiments, in a case where the vibrating device 260 includes a plurality of multi-dimensional vibrating lenses, the type of multi-dimensional vibrating lens that needs to be selected may be determined based on the resolution of the image to be displayed and the resolution of the digital micromirror device 240, and the preset frame division method is determined. That is, the frame division processor 44 pre-stores various preset frame division methods and selects an appropriate one or more multi-dimensional vibrating lens of the vibrating device 260 according to the resolution of the image data of the image to be displayed and the resolution of the digital micromirror device 240. For example, if the resolution of the image to be displayed is 6×1920×1080 and the resolution of the digital micromirror device 240 is 1920×1080, it may be determined that the type of multi-dimensional vibrating lens to be used is a six-dimensional vibrating lens. Since the vibration dimension of the six-dimensional vibrating lens is six-dimensional, the six-dimensional vibrating lens may vibrate in six directions in sequence, so that the corresponding preset frame division method may be determined, such as the preset frame division method in FIG. 14.

In some embodiments of the present disclosure, the display driving sub-circuit 420 further includes a light valve driving assembly 42 and a laser source driving assembly 41. The light valve driving assembly 42 is coupled to the optical modulating assembly 200, and the laser source driving assembly 41 is coupled to the laser source 100.

In some embodiments, the laser source driving assembly 41 is configured to output the image signal of each frame of sub-image to the laser source 100 based on the frame division control signal. That is, according to the image signal of each frame of sub-image, the laser source driving assembly 41 controls the laser assembly 11 of the laser source 100 to emit corresponding illumination beams.

In some embodiments, the light valve driving assembly 42 is configured to output the image signal of each frame of sub-image to the optical modulating assembly 200 based on the frame division control signal. That is, the light valve driving assembly 42 controls the optical modulating assembly 200 to output the image signal of each frame of sub-image according to the frame division control signal of the driving control signal. The light valve driving assembly 42 controls the micromirrors 2401 of the digital micromirror device 240 to rotate. The frame division processor 44 may generate each frame of sub-image into a corresponding frame division control signal. The light valve driving assembly 42 sends the frame division control signals to the digital micromirror device 240 connected thereto. The digital micromirror device 240 may control the corresponding micromirrors 2401 to rotate based on the frame division control signal corresponding to each frame of sub-image output by the frame division processor 44, so that the image signal of each frame of sub-image may be output according to a predetermined output timing. The image signal of each frame of sub-image may be an optical signal including all pixels of each frame of sub-image.

In order to implement the projection display of the image to be displayed, the light valve driving assembly 42 outputs a vibration instruction to the vibrating device 260 to control the vibrating device 260 to perform vibrations in multiple directions. The vibrating device 260 may perform vibrations in corresponding directions based on the output timing of the image signal of each frame of sub-image, so that the projection beam of each frame of the sub-image is transmitted and output through the vibrating device 260. The projection beams processed by vibration may be used together to project and display the image to be displayed.

It will be noted that although the image signal of each frame of sub-image is output according to the predetermined output timing and will also be projected and displayed according to the predetermined timing, due to the continuous and rapid nature of the entire output process and the phenomenon of visual persistence in the human eye, the final visual presentation displays an image that contains all the pixels of all sub-images, which is the image to be displayed.

In some embodiments, the vibration instruction output by the light valve driving assembly 42 to the vibrating device 260 is determined based on the frame division control signal of the image signal of each frame of sub-image. For example, the resolution of the image to be displayed is 8×1920×1080, the resolution of the digital micromirror device 240 is 1920×1080, and the preset frame division method in the frame division processor 44 is the preset frame division method as shown in FIG. 10. Correspondingly, three two-dimensional vibrating lenses may be sequentially provided to be matched with the digital micromirror device 240. For convenience of description, a two-dimensional vibrating lens of the vibrating device 260 closest to the digital micromirror device 240 is referred to as a first vibrating lens, a two-dimensional vibrating lens adjacent to the first vibrating lens is a second vibrating lens, and a two-dimensional vibrating lens adjacent to the second vibrating lens is a third vibrating lens.

Firstly, the frame division processor 44 performs frame division on the image to be displayed according to the preset frame division method as shown in FIG. 10 and generates a frame division control signal. Secondly, the digital micromirror device 240 outputs image signals of the obtained eight frames of sub-images based on a predetermined output timing in the frame division control signal. Then, based on the vibration instruction in the frame division control signal, the vibrating device 260 controls the three two-dimensional vibrating lenses to perform vibrations in corresponding directions respectively based on the output timing of the image signal of each frame of sub-image, so that the projection beam of each frame of sub-image processed by three-level vibration may be transmitted and output.

For example, the frame division control signal may include that, at a first moment, the digital micromirror device 240 may output the seventh image, and correspondingly, the first vibrating lens, the second vibrating lens, and the third vibrating lens in the vibrating device 260 may all vibrate obliquely upwards. At a second moment, the digital micromirror device 240 may output the eighth image, and correspondingly, the first vibrating lens and the second vibrating lens in the vibrating device 260 may keep vibrating obliquely upward, and the third vibrating lens may turn to vibrate obliquely downward. At a third moment, the digital micromirror device 240 may output the ninth image, and correspondingly, the first vibrating lens in the vibrating device 260 may keep vibrating obliquely upward, the second vibrating lens may turn to vibrate obliquely downward, and the third vibrating lens may turn back to vibrate obliquely upward. At a fourth moment, the digital micromirror device 240 may output the tenth image, and correspondingly, the first vibrating lens in the vibrating device 260 may keep vibrating obliquely upward, the second vibrating lens may keep vibrating obliquely downward, and the third vibrating lens may turn to vibrate obliquely downward again. At a fifth moment, the digital micromirror device 240 may output the eleventh image, and correspondingly, the first vibrating lens in the vibrating device 260 may turn to vibrate obliquely downward, and the second vibrating lens and the third vibrating lens may turn back to vibrate obliquely upward. At a sixth moment, the digital micromirror device 240 may output the twelfth image, and correspondingly, the first vibrating lens in the vibrating device 260 may keep vibrating obliquely downward, the second vibrating lens may keep vibrating obliquely upward, and the third vibrating lens may turn to vibrate obliquely downward again. At a seventh moment, the digital micromirror device 240 may output the thirteenth image, and correspondingly, the first vibrating lens in the vibrating device 260 may keep vibrating obliquely downward, the second vibrating lens may turn to vibrate obliquely downward, and the third vibrating lens may turn back to vibrate obliquely upward. At an eighth moment, the digital micromirror device 240 may output the fourteenth image, and correspondingly, the first vibrating lens and the second vibrating lens in the vibrating device 260 may keep vibrating obliquely downward, and the third vibrating lens may turn to vibrate obliquely downward again. Therefore, the optical modulating assembly 200 is controlled to cause the image signals of the seventh sub-image to the fourteenth sub-image to be presented at corresponding positions in sequence and to be jointly used for projecting and displaying the image to be displayed.

In some embodiments, the resolution of the image to be displayed is 8×1920×1080, the resolution of the digital micromirror device 240 is 2715×1527, and the vibrating device 260 includes a four-dimensional vibrating lens. The preset frame division method in the frame division processor 44 is the preset frame division method as shown in FIG. 15. When performing projection display, the frame division processor 44 performs frame division on the image to be displayed according to the preset frame division method as shown in FIG. 15 and generates a frame division control signal. The digital micromirror device 240 output image signals of the obtained four frames of sub-images based on a predetermined output timing and then transmits and outputs the projection beam of each frame of the sub-image processed by vibration through the four-dimensional vibrating lens of the vibrating device 260.

For example, the frame division control signal may include that, at the first moment, the digital micromirror device 240 may output the first image, and accordingly, the four-dimensional vibrating lens of the vibrating device 260 may vibrate upwards to the left. At a second moment, the digital micromirror device 240 can output the second image, and accordingly, the four-dimensional vibrating lens of the vibrating device 260 may vibrate upwards to the right. At a third moment, the digital micromirror device 240 may output the third image, and correspondingly, the four-dimensional vibrating lens of the vibrating device 260 may vibrate downward to the right. At a fourth moment, the digital micromirror device 240 may output the fourth image, and accordingly, the four-dimensional vibrating lens of the vibrating device 260 may vibrate downward to the left. Therefore, the optical modulating assembly 200 is controlled to cause the image signal of each sub-image to be presented at corresponding positions in sequence, and to be jointly used for projecting and displaying the image to be displayed.

In some embodiments, the driving control signal further includes a color control signal. The display driving sub-circuit 420 is configured to receive a color control signal of each frame of sub-image and control the laser source 100 and/or the optical modulating assembly 200 to output the image signal of each frame of the sub-image based on the color control signal.

As shown in FIGS. 7A and 7B, the image processing sub-circuit 430 further includes a color processor 43. The color processor 43 is configured to generate a color control signal based on the image signal of each frame of sub-image and send the color control signal to the display driving sub-circuit 420. The color processor 43 may perform color processing on the image data of the image to be displayed or the image data of the sub-image, obtain the color control signal of each frame of the sub-image, output the color control signal to the light valve driving assembly 42 and/or the laser source driving assembly 41, and control the light valve driving assembly 42 and the laser source driving assembly 41 based on the color control signal.

In some embodiments, an order in which the color processor 43 and the frame division processor 44 perform image data processing may be that the frame division processor 44 first performs the frame division, and then the color processor 43 performs the color processing operation on the image data of the sub-image. It may further be that the color processor 43 first performs the color processing operation on the image data of the image to be displayed, and then the frame division processor 44 performs the frame division operation. It may further be that the frame division processor 44 performs the frame division, while the color processor 43 performs the color processing operation on image data of divided sub-images. In a physical implementation, the frame division processor 44 and the color processor 43 may be integrated with a same image processing chip, and the adaptation circuit can be configured accordingly.

By setting up relatively independent display driving sub-circuit 420 and image processing sub-circuit 430, the color control signal is obtained through processing the image data of the image to be displayed by the image processing sub-circuit 430, so that the display driving sub-circuit 420 does not need to directly process the image data of the image to be displayed. In such a structure, the image data of the image to be displayed may be processed through a high-performance image processing sub-circuit 430. For example, the 8K image data may be processed by an image processing sub-circuit 430 with an ability to process 8K image data, and the color control signal obtained after processing is sent to the display driving sub-circuit 420. Then, the display driving sub-circuit 420 drives the optical modulating assembly 200 based on the color control signal, thereby enabling 8K video playback, breaking through the bottleneck of 8K resolution.

In some embodiments, the color processor 43 sends the color control signal to the laser source driving assembly 41. The color control signal is a three-color light signal, and the laser source driving assembly 41 is configured to receive the color control signal and control the laser source 100 to output the image signal of each frame of sub-image based on the color control signal.

The laser source driving assembly 41 further includes a laser driving sub-assembly 411 and a motion device driving sub-assembly 412. For example, in a case where the laser assembly 11 of the laser source 100 includes three laser arrays, the laser source driving assembly 41 controls the three laser arrays to be a red laser array 130, a green laser array 120, and a blue laser array 110, respectively, that is, controls the three-color laser source to emit illumination beams. The laser driving sub-assembly 411 may obtain information such as a lighting sequence and a display brightness duty of the red laser array 130, the green laser array 120, and the blue laser array 110 based on the three-color light signal. The color processor 43 may transmit the information to the laser driving sub-assembly 411. The driving method of the laser driving sub-assembly 411 may include controlling the lighting sequence and the display brightness duty of the red laser array 130, the green laser array 120, and the blue laser array 110 to achieve color control of the laser assembly 11.

In some embodiments, the color processor 43 sends the color control signal to the motion device driving sub-assembly 412. The motion device driving sub-assembly 412 is configured to receive the color control signal and control the color wheel assembly 12 of the laser source 100 to output the image signal of each frame of sub-image based on the color control signal.

In some embodiments, the color processor 43 sends the color control signal to the light valve driving assembly 42. The light valve driving assembly 42 is configured to receive the color control signal and control the optical modulating assembly 200 to output the image signal of each frame of sub-image based on the color control signal.

In some embodiments of the present disclosure, referring to FIGS. 7A and 7B, the circuit architecture 400 further includes a control assembly 421 coupled to the display driving circuit 410. The control assembly 421 is configured to transmit control data to the image processing sub-circuit 430. For example, the control assembly 421 transmits the preset frame division method to the image processing sub-circuit 430. The frame division processor 44 of the image processing sub-circuit 430 receives the preset frame division method, and the frame division processor 44 generates the frame division control signal according to the preset frame division method. The display driving sub-circuit 420 receives the frame division control signal and outputs the image signal of each frame of sub-image to the optical modulating assembly 200 based on the frame division control signal.

In some embodiments, the control assembly 421 controls the color processor 43 of the image processing sub-circuit 430 to process the image data of the image to be displayed into the color control signal based on the control data and transmits the color control signal to the display driving sub-circuit 420. The control assembly 421 causes the image processing sub-circuit 430 to output the color control signal to the display driving sub-circuit 420 based on the image data of the image to be displayed.

In some embodiments, the control data further includes a digital light processing program. The image processing sub-circuit 430 and the display driving sub-circuit 420 are configured accordingly to process the image to be displayed based on the control data, thereby outputting the image signal of each frame of sub-image to the optical modulating assembly 200.

In some embodiments, based on the control data, the image processing sub-circuit 430 is controlled to receive externally provided image data in a first format and convert the image data in the first format into image data in a second format that is matched with the image processing sub-circuit 430. That is, the control data further includes a format conversion method. For example, the image data of the image to be displayed is format converted according to a receiving format of the frame division processor 44. For another example, the image data of the image to be displayed is format converted according to a receiving format of the color processor 43.

In some embodiments of the present disclosure, the control assembly 421 includes a microcontroller unit (MCU) 4212 and a memory (e.g., a flash) 4211. The microcontroller 4212 is coupled to the memory 4211 and the display driving circuit 410. The memory 4211 is configured to store the control data, such as storing the preset frame division method. The microcontroller 4212 is configured to transmit the preset frame division method to the frame division processor 44 of the image processing sub-circuit 430. The frame division processor 44 processes the image data of the image to be displayed into the frame division control signal based on the control data and transmits the frame division control signal to the display driving sub-circuit 420. The microcontroller 4212 is further configured to obtain the digital light processing program in the memory 4211 and transmit the digital light processing program to the image processing sub-circuit 430.

The microcontroller 4212 obtains the control data and transmits the control data to the image processing sub-circuit 430. For example, the microcontroller 4212 controls the color processor 43 of the image processing sub-circuit 430. The color processor 43 generates the color control signal based on the image signal of each frame of sub-image and sends the color control signal to the display driving sub-circuit 420. The color processor 43 may output the color control signal to the light valve driving assembly 42 and/or the laser source driving assembly 41 and control the light valve driving assembly 42 and the laser source driving assembly 41 based on the color control signal.

In some embodiments, the microcontroller 4212 transmits the control data to the image processing sub-circuit 430 during a turned-on phase. For example, the program burning and initialization of the frame division processor 44 and/or the color processor 43 are performed.

In some other embodiments of the present disclosure, referring to FIG. 7A and FIG. 7B, the circuit architecture 400 further includes a main control circuit 427. The main control circuit 427 is further referred to as a main board or a TV board. The main control circuit 427 is coupled to the display driving circuit 410. The main control circuit 427 is configured to convert the image to be displayed in the first format into the image to be displayed in the second format that is matched with the image processing sub-circuit 430.

The main control circuit 427 further includes a signal converter 426, and the signal converter 426 is coupled to the image processing sub-circuit 430. The signal converter 426 is configured to receive the externally provided image data in the first format and convert the image data in the first format into the image data in the second format that is matched with the image processing sub-circuit 430. That is, the signal converter 426 receives the image data of the image to be displayed in the first format and inputs the image data of the image to be displayed in the second format that is matched with the image processing sub-circuit 430 to the image processing sub-circuit 430. The term "matched" here may be considered as a format that the image processing sub-circuit 430 is capable of processing, that is, a format that is matched with the image processing sub-circuit 430. Since different image processing sub-circuits 430 may process different signal formats, the signal converter 426 is provided so that various types of image processing sub-circuits 430 may be applied, especially the frame division processor 44 and/or the color processor 43 that do not have the ability to convert formats may also be applied, which reduces the manufacturing difficulty.

For example, the image processing sub-circuit 430 may be implemented as a field programmable gate array (FPGA) board, and the first format is v-by-one (a signal transmission interface standard suitable for displays), and the second format is mini SAS (serial attached SCSI) (serial attached SCSI (small computer system interface) is an interface technology commonly used in small computer systems, and mini SAS is an SAS standard). In this case, the signal converter 426 may be a v-by-one to mini-SAS signal adapter board.

In some embodiments, the main control circuit 427 is configured to transmit the image to be displayed and the control data to the image processing sub-circuit 430, where the control data includes the preset frame division method. Here, different from where the control assembly 421 transmits the control data to the image processing sub-circuit 430, the main control circuit 427 directly transmits the image data and the control data of the image to be displayed to the image processing sub-circuit 430. For example, the main control circuit 427 directly transmits the preset frame division method to the frame division processor 44, so that the frame division processor 44 processes the image data of the image to be displayed into the frame division control signal based on the control data, and transmits the frame division control signal to the display driving sub-circuit 420. In this way, there is no need to program burn and initialize the image processing sub-circuit 430 during each turned-on phase.

In some embodiments, the main control circuit 427 further includes a system on chip (SOC) 4271 and a frame rate conversion (FRC) chip 4272.

The system on chip 4271 is coupled to the frame rate conversion chip 4272. The frame rate conversion chip 4272 is coupled to the signal converter 426. The system on chip 4271 contains a complete system with embedded software. The system on chip 4271 may be connected to an external device to receive the image data of the image to be displayed. For example, the system on chip 4271 may be connected to the external device through a high definition multimedia interface (HDMI).

The microcontroller 4212 is coupled to the memory 4211 and the system on chip 4271, respectively, and the memory 4211 is further configured to store the digital light processing program. In some embodiments, the microcontroller 4212 may be configured to obtain the digital light processing program and transmit the digital light processing program to the display driving sub-circuit 420. In addition, the memory

4211 is further configured to store the digital light processing program, the preset frame division methods, and the format conversion method.

The microcontroller 4212 is further configured to control the display driving sub-circuit 420, so that the display driving sub-circuit 420 controls the light valve driving assembly 42 and the laser source driving assembly 41 based on the digital light processing program. For example, the laser driving sub-assembly 411 is controlled based on the frame division control signal and/or the color control signal.

In some embodiments, the control assembly 421 is further configured to control the laser source driving assembly 41 based on the control data, such as controlling the motion device driving sub-assembly 412. The color wheel assembly 12 includes at least one filter wheel and at least one fluorescent wheel, and the at least one filter wheel and the at least one fluorescent wheel may be controlled based on the digital light processing program of the control data.

In some embodiments, the microcontroller 4212 is coupled to the system on chip 4271 through an inter-integrated circuit (I2C) or a universal asynchronous receiver and transmitter. The microcontroller 4212 is coupled to the image processing sub-circuit 430 through a serial peripheral interface (SPI), and the image processing sub-circuit 430 is coupled to the display driving sub-circuit 420 through a high-speed serial interface (HSSI). The display driving sub-circuit 420 is coupled to the light valve driving assembly 42 through HSSI. The display driving sub-circuit 420 may be implemented as a DLPC9740 display panel.

The image processing sub-circuit 430 is configured to process the 8K resolution image data into a red control signal, a green control signal, and a blue control signal, and output the red control signal, the green control signal, and the blue control signal to the laser driving sub-assembly 411 of the driving assembly 420 accordingly. The laser driving sub-assembly 411 may drive the red laser array 130 according to the processed red control signal, the green laser array 120 according to the processed green control signal, and the blue laser array 110 according to the processed blue control signal. That is, the laser driving sub-assembly 411 may control the three laser arrays of the laser assembly 11.

In addition, the circuit architecture 400 may further include other sub-circuits, the sub-circuits may include a key board, a remote control board, a wireless fidelity board, and/or a Bluetooth board, which is not limited.

In summary, the driving control signal (e.g., the frame division control signal and/or the color control signals) is obtained by providing the control assembly 421 and the image processing sub-circuit 430 that are independent from the main control circuit 427 and using the control assembly 421 to control the image processing sub-circuit 430 to process the image signal. The optical modulating assembly 200 and the laser source 100 are controlled by the display driving sub-circuit 420 based on the driving control signal. In this way, the overall image processing capability may be improved by upgrading the image processing sub-circuit 430 through hardware or software. It solves the problem of difficulty in improving the image processing capability and implements the effect of easily improving the image processing capability.

Figure 16:
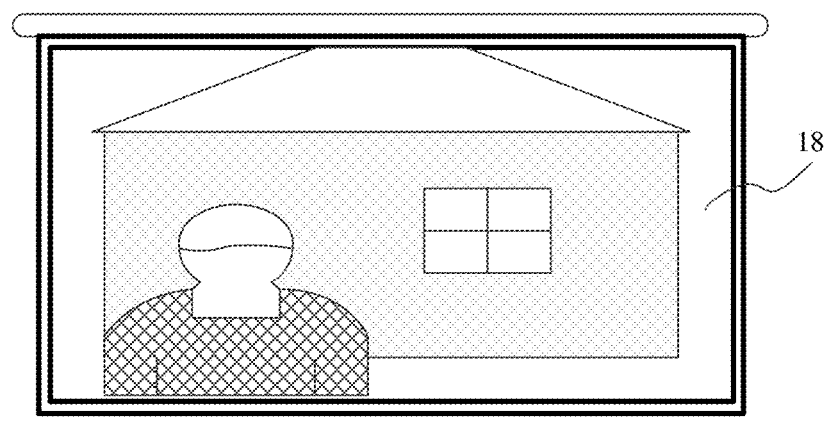
FIG. 16 is a structural diagram of a projection display systems, in accordance with some embodiments of the present disclosure.
Figure 16:
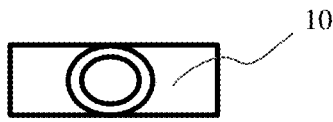

Some embodiments of the present disclosure provide a projection display system 80. As shown in FIG. 16, the projection display system 80 includes a projection screen 18 and the laser projection apparatus 10 in any of the above embodiments. FIG. 16 shows the hardware structure of the projection display system 80 exemplarily. For ease of explanation, the projection display system 80 is schematically illustrated by taking the laser projection apparatus 10 and the separately provided projection screen 18 as an example. For example, the projection screen 18 is a curtain that may be raised and lowered.

Some embodiments of the present disclosure provide a projection display method. It will be noted that the projection display method may be applied to the laser projection apparatus 10 or the projection display system 80 in the above embodiments and may also be applied to other digital light processing projection devices with equivalent structures or functions. The laser projection apparatus includes an optical modulating assembly 200, a vibrating device, and a laser source. The optical modulating assembly 200 includes a digital micromirror device.

Figure 17:
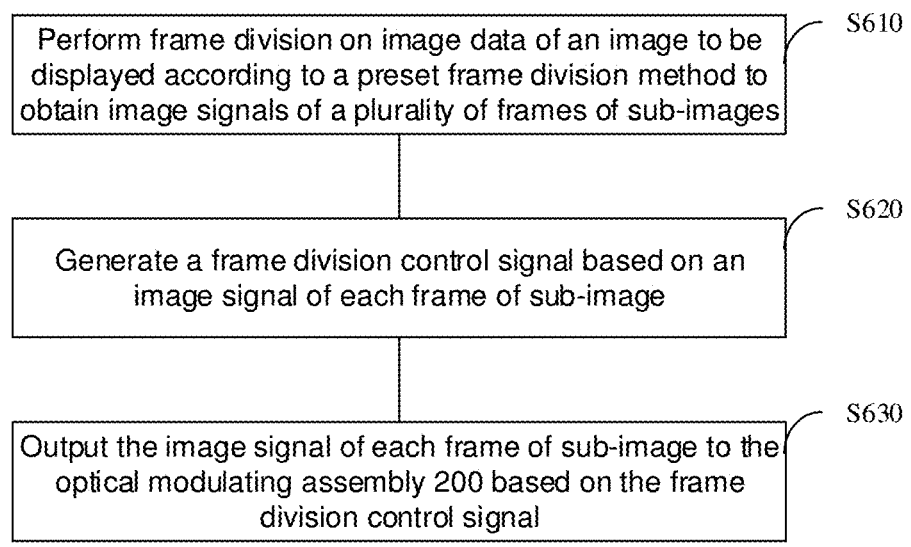
FIG. 17 is a flow diagram of a projection display method of a laser projection apparatus, in accordance with some embodiments.

In some embodiments, as shown in FIG. 17, the projection display method includes step S610, step S620, and step S630.

In S610, frame division is performed on image data of an image to be displayed according to a preset frame division method to obtain image signals of a plurality of frames of sub-images.

In S620, a frame division control signal is generated based on an image signal of each frame of sub-image.

In S630, the image signal of each frame of sub-image is output to the optical modulating assembly 200 based on the frame division control signal.

S630 further includes that the image signals of the plurality of frames of sub-images are output to the digital micromirror device 240 according to an output timing of the image signals of the plurality of frames of sub-images based on the frame division control signal; and a vibration instruction is output to the vibrating device 260 based on the output timing of the image signals of the plurality of frames of sub-images, so as to control the vibrating device to perform vibrations in multiple directions, so that the projection beams corresponding to different image signals of the sub-images are output through vibrations of the vibrating device in sequence.

In the projection display method, the digital micromirror device is configured to output the image signal of each frame of sub-image based on the frame division control signal corresponding to each frame of sub-image according to the output timing of the image signal of each frame of sub-image. The vibrating device is configured to perform vibrations in corresponding directions based on the output timing of the image signal of each frame of sub-image, so that the projection beam of each frame of sub-image is transmitted and output through the vibrating device 260, and then the image signals of the plurality of frames of sub-images processed by multi-level vibration are jointly projected and displayed.

The preset frame division method in S610 is related to the resolution of the digital micromirror device and the resolution of the image to be displayed. For example, firstly, the type and quantity of the vibrating device to be used are determined based on the resolution of the image to be displayed and the resolution of the digital micromirror device, and then the preset frame division method is determined. Secondly, in S620, the image data of the high-resolution image to be displayed is divided into image signals of a plurality of low-resolution sub-images that the digital micromirror device is capable of displaying. Then, in S630, the vibrating device 260 vibrates in the corresponding directions, so that the image signal of each frame of sub-image are presented at corresponding positions, thereby realizing the display of high-resolution images.

The above-mentioned projection display method further includes a step of receiving the preset frame division method. The preset frame division method may be referred to FIGS. 9 to 11 and FIGS. 13 to 15. In the preset frame division method, the resolution of each sub-image is less than or equal to the resolution of the digital micromirror device.

In addition, the vibrating device may include a plurality of vibrating devices, and the plurality of vibrating devices are matched with the digital micromirror device and are arranged in sequence. The vibrating device may also include at least one multi-dimensional vibrating device, and the multi-dimensional vibrating device is configured to be matched with the digital micromirror device, which will not be repeated here.

Taking the preset frame division method in FIG. 15 as an example, after receiving the preset frame division method, first, in S610, the frame division is performed on the image data of the image to be displayed according to the preset frame division method to obtain the image signals of the plurality of frames of sub-images (i.e., the first image to the fourth image). Secondly, the frame division control signal is generated based on the first image to the fourth image. Then, the digital micromirror device may output the image signals of the obtained four frames of sub-images (i.e., the image signals of the first image to the fourth image) according to the predetermined output timing in the frame division control signal. Then, the two two-dimensional vibrating lenses of the vibrating device respectively perform vibrations in the corresponding directions (e.g., the four directions of upper left, upper right, lower right, lower left) based on the output timing of the image signal of each frame of sub-image in the frame division control signal. Therefore, the projection beam of each frame of sub-image processed by two-level vibration may be transmitted and output, and then the projection beams of the plurality of frames of sub-images may be projected and displayed together.

In some embodiments, the projection display method includes step S640, step S610, step S620, step S650, and step S630.

In S640, an image to be displayed in a first format is converted into an image to be displayed in a second format.

In S610, frame division is performed on image data of the image to be displayed according to a preset frame division method to obtain image signals of a plurality of frames of sub-images.

In S620, a frame division control signal is generated based on an image signal of each frame of sub-image.

In S650, a color control signal is generated based on the image signal of each sub-image.

In S630, the image signal of each frame of sub-image is output to the optical modulating assembly 200 based on the frame division control signal and/or the color control signal.

The difference from the above projection display method is that before S610 and in S640, the image to be displayed in the first format is converted into the image to be displayed in the second format. That is, the image data of the image to be displayed during the frame division is the image data that has been format-converted. For example, the first format is v-by-one and the second format is mini SAS. In this case, S640 may be performed by a v-by-one to mini-SAS signal adapter board.

It will be noted that S640 and S610 may be performed by a same execution subject, such as the image processing sub-circuit. S640 and S610 may be performed by different execution subjects. For example, S640 may be performed by the main control circuit, and S610 may be performed by the image processing sub-circuit. In some embodiments, the image data of the image to be displayed in the first format is received, and the image data of the image to be displayed in the second format matched with the image processing sub-circuit is input. The term "matched" here may be considered as a format that the image processing sub-circuit is capable of receiving and being compatible with.

In some embodiments, the projection display method further includes S650. In S650, the color control signal is generated based on the image signal of each frame of sub-image, and the image signal of each frame of sub-image is output to the laser source based on the color control signal. After receiving the image data to be displayed, the image signal of each frame of sub-image and the execution method of outputting the image signal of each frame of sub-image are obtained through the image processing of S610 and the driving processing of S620 and S650. That is, in S630, the output of the image signal of each frame of sub-image is performed based on the frame division control signal and/or the color control signal.

In S650, the image data of the image to be displayed or the image data of the sub-image may be color processed to obtain the color control signal of each frame of the sub-image. Then, the optical modulating assembly 200 and/or the laser source outputs the image signal of each frame of sub-image according to the color control signal.

In some embodiments, the sequence of performing the image data processing in S650 and S610 may be that the frame division is performed firstly in S610, and then the color processing operation on the image data of the sub-image is performed in S650. It may also be that the color processing operation on the image data of the sub-image is performed firstly in S650, and then the frame division operation is performed in S610. It may further be that the frame division is performed in S610, while the color processing operation is performed on the image data of the divided sub-images.

In some embodiments, in a case where the frame division processing operation is performed firstly in S610, and then the color processing operation on the image data of the sub-image is performed in S650, and S650 may be performed synchronously with S620. That is, the driving control signal is generated based on the image signal of each frame of sub-image, and the driving control signal includes the frame division control signal and the color control signal.

The above-mentioned projection display method further includes a step of receiving the preset frame division method. The preset frame division method may be referred to FIGS. 9 to 11 and FIGS. 13 to 15. In the preset frame division method, the resolution of each sub-image is less than or equal to the resolution of the digital micromirror device. In addition, the vibrating device may include a plurality of vibrating lenses or at least one multi-dimensional vibrating lens, which will not be repeated here.

Some embodiments of the present disclosure provide a laser projection apparatus. The laser projection apparatus includes an optical modulating assembly 200 and a laser source. The optical modulating assembly 200 includes a digital micromirror device and a vibrating device to implement the projection display method in the above embodiments.

Some embodiments of the present disclosure provide a computer-readable storage medium (e.g., a non-transitory computer-readable storage medium) having stored computer program instructions that, when executed by a computer, cause the computer to execute the projection display method as described in any of the above embodiments.

Some embodiments of the present disclosure further provide a computer program product. The computer program product includes computer program instructions that, when executed by a computer, cause the computer to perform the projection display method described in the above embodiments.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A laser projection apparatus, comprising:
a laser source configured to provide illumination beams;
an optical modulating assembly including a digital micromirror device; the optical modulating assembly being configured to modulate the illumination beams provided by the laser source based on image signals to obtain projection beams;
a vibrating device configured to receive and output the projection beams;
a projection lens configured to receive the projection beams and project the projection beams into an image; and
a circuit architecture configured to drive at least the laser source and the optical modulating assembly to operate, wherein the circuit architecture includes:
a display driving circuit including:
an image processing sub-circuit configured to perform frame division on image data of an image to be displayed according to a preset frame division method to obtain image signals of a plurality of frames of sub-images, generate a frame division control signal based on the image signals of the plurality of frames of sub-images, and send the frame division control signal to a display driving sub-circuit; and
the display driving sub-circuit coupled to the image processing sub-circuit, the digital micromirror device, and the vibrating device and configured to receive the frame division control signal of the plurality of frames of sub-images, output the image signals of the plurality of frames of sub-images to the digital micromirror device according to an output timing of the image signals of the plurality of frames of sub-images based on the frame division control signal, and output a vibration instruction to the vibrating device based on the output timing of the image signals of the plurality of frames of sub-images, so as to control the vibrating device to perform vibrations in multiple directions, so that projection beams corresponding to different image signals of the sub-images are output through vibrations of the vibrating device in sequence.

2. The laser projection apparatus according to claim 1, wherein the preset frame division method is related to a resolution of the digital micromirror device and a resolution of the image to be displayed, and a resolution of each sub-image is less than or equal to the resolution of the digital micromirror device.

3. The laser projection apparatus according to claim 1, wherein the vibrating device satisfies one of the following: the vibrating device including a plurality of vibrating lenses;
or
the vibrating device including at least one multi-dimensional vibrating lens.

4. The laser projection apparatus according to claim 1, wherein the vibrating device is configured to transmit the projection beams.

5. The laser projection apparatus according to claim 1, wherein the display driving sub-circuit includes a light valve driving assembly and a laser source driving assembly; and the light valve driving assembly is coupled to the optical modulating assembly, and the laser source driving assembly is coupled to the laser source; and
the light valve driving assembly is configured to output an image signal of each frame of sub-image to the optical modulating assembly based on the frame division control signal.

6. The laser projection apparatus according to claim 5, wherein the image processing sub-circuit is further configured to generate a color control signal based on the image signal of each frame of sub-image and send the color control signal to the laser source driving assembly.

7. The laser projection apparatus according to claim 6, wherein the color control signal is a three-color light signal, and the laser source driving assembly is configured to receive the color control signal and control the laser source to output the image signal of each frame of sub-image based on the color control signal.

8. The laser projection apparatus according to claim 1, wherein the circuit architecture further includes a control assembly coupled to the display driving circuit, and the control assembly is configured to transmit the preset frame division method to the image processing sub-circuit.

9. The laser projection apparatus according to claim 8, wherein the control assembly includes a microcontroller and a memory; the microcontroller is coupled to the memory and the display driving circuit; the memory is configured to store the preset frame division method; and the microcontroller is configured to transmit the preset frame division method to the image processing sub-circuit.

10. The laser projection apparatus according to claim 1, wherein the image processing sub-circuit is further configured to convert the image to be displayed in a first format into the image to be displayed in a second format matched with the image processing sub-circuit.

11. The laser projection apparatus according to claim 1, further comprising a main control circuit coupled to the display driving circuit; the main control circuit being configured to convert the image to be displayed in a first format into the image to be displayed in a second format matched with the image processing sub-circuit.

12. The laser projection apparatus according to claim 1, further comprising a main control circuit coupled to the display driving circuit; the main control circuit being configured to transmit the image to be displayed and the preset frame division method to the image processing sub-circuit.

13. A projection display system, comprising:
a projection screen; and
the laser projection apparatus according to claim 1.

14. A projection display method of a laser projection apparatus, wherein the laser projection apparatus includes an optical modulating assembly, a vibrating device, and a laser source; the optical modulating assembly includes a digital micromirror device; the method comprises:

performing frame division on image data of an image to be displayed according to a preset frame division method to obtain image signals of a plurality of frames of sub-images;

generating a frame division control signal based on an image signal of each frame of sub-image; and outputting the image signal of each frame of sub-image to the optical modulating assembly based on the frame division control signal; wherein the outputting the frame division control signal to the optical modulating assembly includes outputting the image signals of the plurality of frames of sub-images to the digital micromirror device according to an output timing of the image signals of the plurality of frames of sub-images based on the frame division control signal and outputting a vibration instruction to the vibrating device based on the output timing of the image signals of the plurality of frames of sub-images, so as to control the vibrating device to perform vibrations in multiple directions, so that projection beams corresponding to different image signals of the sub-images are output through vibrations of the vibrating device in sequence.

15. The projection display method according to claim 14, further comprising:

generating a color control signal based on the image signal of each frame of sub-image and outputting the image signal of each frame of sub-image to the laser source based on the color control signal.

16. The projection display method according to claim 14, wherein a resolution of the sub-image of each frame is less than or equal to a resolution of the digital micromirror device.

17. The projection display method according to claim 14, wherein the vibrating device satisfies one of the following:

the vibrating device including a plurality of vibrating lenses;

or the vibrating device including at least one multi-dimensional vibrating lens.

18. The projection display method according to claim 14, wherein the vibrating device is configured to transmit the projection beams.

19. A non-transitory computer-readable storage medium storing computer program instructions that, when executed by a computer, cause the computer to perform one or more steps in the projection display method according to claim 14.

20. A computer program product, comprising computer program instructions stored on a non-transitory computer-readable storage medium; wherein the computer program instructions that, when executed by a computer, cause the computer to perform one or more steps in the projection display method according to claim 14.

* * * * *